United States Patent
Brand et al.

(10) Patent No.: US 12,491,145 B2
(45) Date of Patent: Dec. 9, 2025

(54) SYNTHESIS AND PURIFICATION OF CANNABIGEROL AND ITS APPLICATION

(71) Applicant: SYMRISE AG, Holzminden (DE)

(72) Inventors: Stefan Brand, Vahlbruch (DE); Matthias Winkler, Höxter (DE); Marcus Rudolf Götz, Oberweser (DE)

(73) Assignee: SYMRISE AG, Holzminden (DE)

( * ) Notice: Subject to any disclaimer, the term of this patent is extended or adjusted under 35 U.S.C. 154(b) by 920 days.

(21) Appl. No.: 17/618,111

(22) PCT Filed: Jun. 11, 2019

(86) PCT No.: PCT/EP2019/065125
§ 371 (c)(1),
(2) Date: Dec. 10, 2021

(87) PCT Pub. No.: WO2020/249184
PCT Pub. Date: Dec. 17, 2020

(65) Prior Publication Data
US 2022/0296482 A1   Sep. 22, 2022

(51) Int. Cl.
  *A61K 8/34*   (2006.01)
  *A61K 31/00*  (2006.01)
  *A61Q 19/02*  (2006.01)
  *C07C 37/48*  (2006.01)
  *C07C 37/72*  (2006.01)
  *C07C 37/74*  (2006.01)

(52) U.S. Cl.
  CPC .......... *A61K 8/347* (2013.01); *A61K 31/658* (2023.05); *A61Q 19/02* (2013.01); *C07C 37/48* (2013.01); *C07C 37/72* (2013.01); *C07C 37/74* (2013.01); *C07B 2200/13* (2013.01)

(58) Field of Classification Search
  CPC ........ A61K 8/347; A61Q 19/02; C07C 37/48; C07C 37/72; C07C 37/74; C07B 2200/13
  See application file for complete search history.

(56) References Cited

U.S. PATENT DOCUMENTS

2019/0060252 A1   2/2019   Changoer et al.
2020/0115306 A1*  4/2020   Smeltzer .................. B01J 27/12

FOREIGN PATENT DOCUMENTS

WO   2014134281 A1   9/2014

OTHER PUBLICATIONS

International Search Report and Written Opinion issued on May 4, 2020 for corresponding PCT Application No. PCT/EP2019/065125.
Baek, S-H et al., "Synthesis and Antitumoractivity of Cannabigerol", Archives of Pharmacal Research, Natl., Fisheries University, Pusan, KR, vol. 19, No. 3, 1996; pp. 228-230 XP000979791.
Baek, S-H et al., "Boron Trifluoride Etherate on Alimina—A Modified Lewis Acid Reagent. An Improved Synthesis of Cannabidiol", Tetrahedron Letters, Elsevier Ltd, Amsterdam, NL, vol. 26, No. 8, 1985, pp. 1083-1086 XP001095309.

* cited by examiner

*Primary Examiner* — Robert A Wax
*Assistant Examiner* — Olga V. Tcherkasskaya
(74) *Attorney, Agent, or Firm* — POLSINELLI PC

(57) ABSTRACT

The present invention relates to a method for producing cannabigerol and purifying it from a reaction mixture. The present invention also relates to the cosmetic use of cannabigerol for the inhibition of tyrosinase activity and/or the reduction of melanin production in the skin, in particular for reducing pigmentation of the skin, preferably for the improvement of the appearance of the skin in case of hyperpigmentation, lentigo or vitiligo. Furthermore, the present invention relates to cannabigerol for use in a therapeutic method for the inhibition of tyrosinase activity and/or the reduction of melanin production in the skin, preferably for use in a therapeutic method for the treatment and/or prevention of malign skin disorders, in particular skin cancer.

8 Claims, 3 Drawing Sheets

SYNTHESIS AND PURIFICATION OF CANNABIGEROL AND ITS APPLICATION

CROSS-REFERENCE TO RELATED APPLICATIONS

Figure 1:
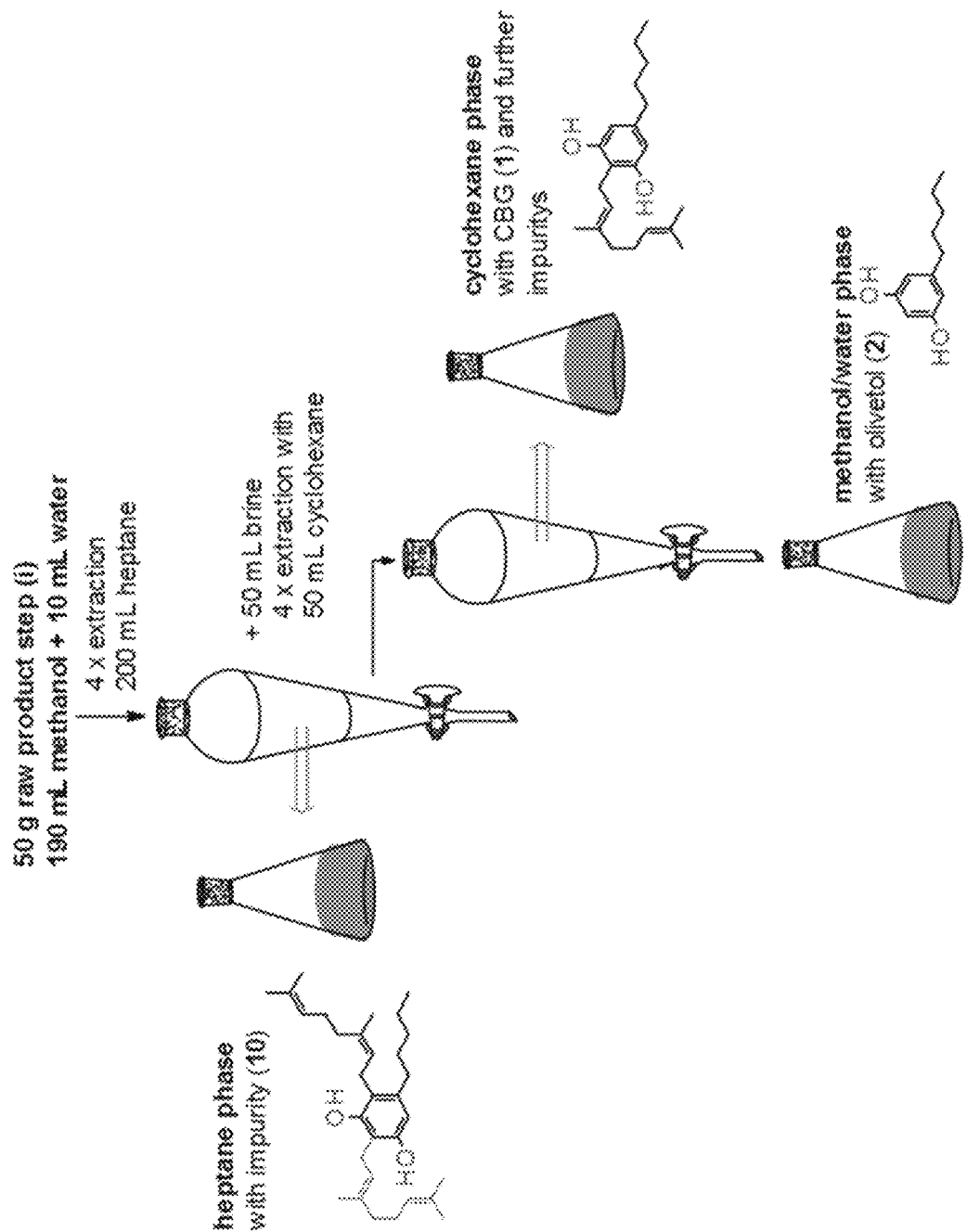

This application is a national stage application (under 35 U.S.C. § 371) of PCT/EP2019/065125, filed Jun. 11, 2019, which is incorporated herein by reference in its entirety.

The present invention relates to a method for producing cannabigerol and purifying it from a reaction mixture. More specifically, the present invention relates to a method for producing cannabigerol comprising i) reacting olivetol with one or a mixture of two or more allylic compound(s) having a leaving group in the presence of an acidic or lewis acidic catalyst, and ii) purifying the product by distillation or liquid-liquid extraction. The present invention also relates to the cosmetic use of cannabigerol for the inhibition of tyrosinase activity and/or the reduction of melanin production in the skin, in particular for reducing pigmentation of the skin, preferably for the improvement of the appearance of the skin in case of hyperpigmentation, lentigo or vitiligo. Furthermore, the present invention relates to cannabigerol for use in a therapeutic method for the inhibition of tyrosinase activity and/or the reduction of melanin production in the skin, preferably for use in a therapeutic method for the treatment and/or prevention of malign skin disorders, in particular skin cancer.

Cannabigerol (CBG) (1) is, unlike the more commonly known phytocannabinoids Cannabidiol (CBD) (19) and (−)-trans-$\Delta^9$-Tetrahydrocannabinol (THC) (17), known as the precursor to the above mentioned cannabinoids in the *cannabis* plant. Whilst CBD (19) and THC (17) are well known and used for their pharmaceutical relevant properties, CBG (1) is relatively unnoticed.

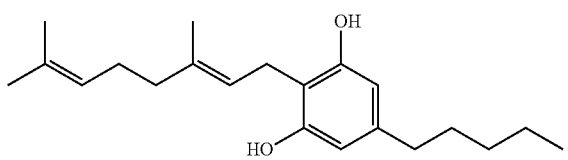

(1)

The plant synthesizes Cannabigerolic acid (CBGA) (21) from hexanoyl-CoA with Olivetolic acid as an intermediate. CBGA (21) can then be transformed either in Cannabidiolic acid (CBDA) (20) or Tetrahydrocannabinolic acid (THCA) (18). Both CBDA (20) and THCA (18) are main targets for various extraction techniques to isolate these compounds and subsequently to decarboxylate them to CBD and THC, respectively (Hanus: Royal Society of Chemistry, 2016, 33, 1347-1448).

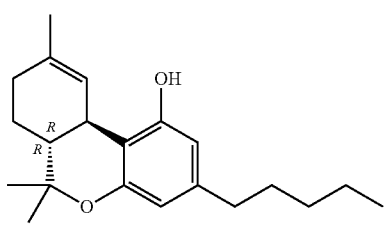

(17)

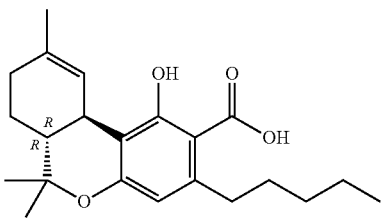

(18)

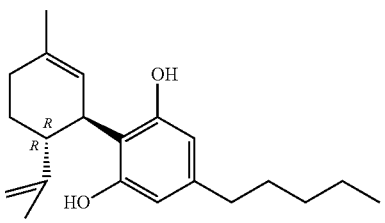

(19)

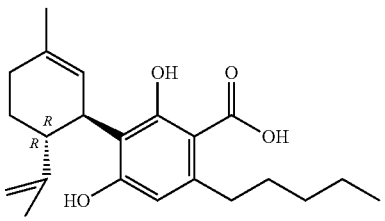

(20)

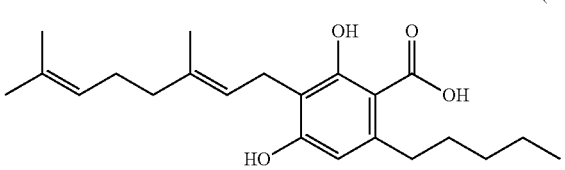

(21)

The increasing demand of cannabinoids like CBD (19) and THC (17), in the course of the legalization of cannabinoids as medicinal products, forecasts a future need of CBG (1) as either a raw material or as an active pharmaceutical ingredient.

Because of its agonistic effect on both cannabinoid receptors (CB1 and CB2) and no psychoactive properties, cannabigerol has a potentially broad biological activity spectrum without having the restrictions of a narcotic drug.

Preliminary biological investigations demonstrate that CBG could be used for treating intestinal disorders (Borelli: *Biochem Pharmacol*, 2013, 85(9), 1306-1316), neurodegenerative diseases (Valdeolivas: *Neurotherapeutics*, 2014, 12(1), 185-199) and cancer (Soderstrom: *Frontiers in Pharmacology*, 2017, 8, 720) as well as for affecting eating behavior (Brierley: *Psychopharmacology*, 2016, 233, 3603-3613).

Due to the rudimentary existing biological data of CBG, a broader biological study was done for synthetic CBG in the context of the present invention. The biological study shows that CBG has a surprisingly strong effect on the monooxygenase tyrosinase, which is a key enzyme in melanogenesis, the production of melanin. The tyrosinase is closely related to various skin disorders like hyperpigmentation, lentigo, vitiligo and skin cancer (Rao: *Journal of Agricultural and Food Chemistry*, 2013, 61, 3842-3851). Additionally, inhibition of melanin production can have some cosmetic benefits due to skin whitening/lightening.

CBG can be produced by chemical synthesis (Mechoulam: *Tetrahedron Letters*, 1968, 60, 5349-5352; Taura: *The*

*Journal of Biological Chemistry,* 1996, 29, 17411-17416; WO2014134281 A1; WO2016030828 A1), extraction of plant materials (WO2018061009 A1) or by biotechnological processes (WO2014134281 A1; WO2016030828 A1; WO2018148848 A1).

To date, the main focus of CBG isolation is on the extraction of plant material, either as CBG (1) or as CBGA (21) followed by decarboxylation (WO2018061009 A1). Extraction from plant material has the well-known issues of purification from a vast amount of different compounds, the varying amount of product from plant to plant and the dependency on plant growth cycles as well as legal restrictions for cultivating the plants.

Another alternative for industrial scale production are biotechnological processes (e.g. synthesis of phytocannabinoids or their precursors by yeast bacteria), which are still in early development and are struggling with the availability of raw materials as well as low yields and low reproducibility (WO2014134281 A1; WO2016030828 A1; WO2018148848 A1).

A major issue in all methods of CBG production is the purification of CBG from a mixture comprising similar side products or side components. However, for application in cosmetic or pharmaceutic products, a high purity is mandatory.

Classical chemical synthesis of CBG from olivetol (2) seems to be the best alternative for industrial scale production. Chemical synthesis can lead to a regulatory safe active pharmaceutical ingredient. The known literature (WO2014134281 A1; WO2016030828 A1; Mechoulam: *Tetrahedron Letters,* 1968, 60, 5349-5352; Taura: *The Journal of Biological Chemistry,* 1996, 29, 17411-17416), however, does not present a clearly developed process either due to purity issues or the use of cost sensitive chromatographic purification methods.

The alkylation of the aromatic ring of olivetol is performed as a Friedel-Crafts-Alkylation. One problem of a Friedel-Crafts-Alkylation is the occurring polyalkylation. This means in particular, that more than one alkyl group attaches itself to the aromatic ring. This is difficult to prevent as the product of the first alkylation gains reactivity (nucleophilicity) due to a positive inductive effect of the newly attached alkyl group. Another problem is the selectivity of the alkylation. Those two aspects lead to byproducts, which are difficult to separate and have a negative influence on the yield. The known synthesis processes for the production of CBG lead to the formation of side products (structural isomers) having highly similar chemical and physical properties and therefore require cost and time intensive purification processes such as HPLC (high performance liquid chromatography) or column chromatography performed in batches.

The Friedel-Crafts-Alkylation results, when olivetol (2) is alkylated with geraniol (3) or linalool (4) under acidic or Lewis acid catalysis, in a regio isomer (5), polyalkylation compounds (10) and the product CBG (1). (Scheme 1)

Scheme (1) The synthesis of Cannabigerol (1) with the major byproducts (regio isomer (5) and polyalkylation compounds (10) where R = H or terpene moiety).

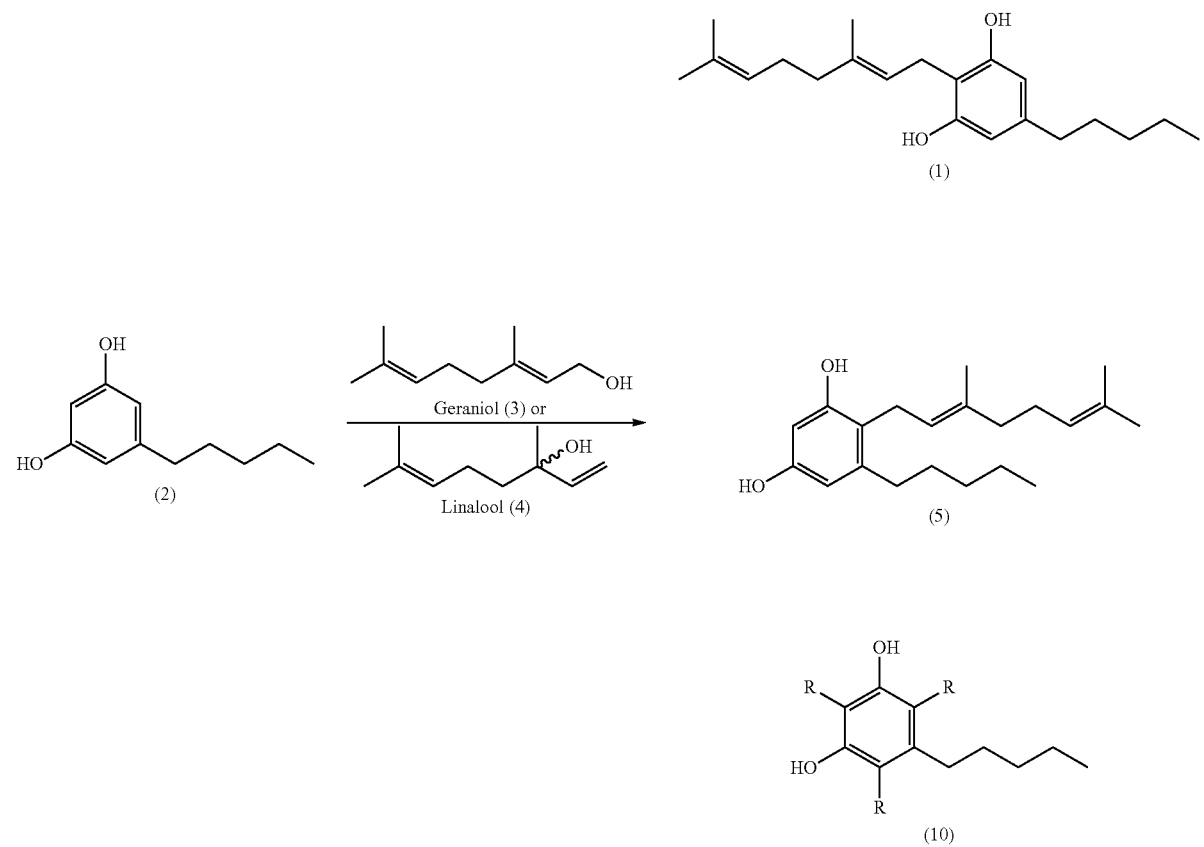

The resulting reaction mixture of product and byproducts is the main problem of this synthetic route because the product is hard to separate from the byproducts.

The literature on cannabigerol synthesis is based on a publication by Mechoulam, which describes the synthesis of cannabigerol (1) from olivetol (2) with geraniol (3) and p-toluenesulfonic acid (Mechoulam: *Tetrahedron Letters*, 1968, 60, 5349-5352). However, a description is missing for the purification. The publication does not provide analytical data or an assessment of the purity of the end product. The described process was tested in the context of the present invention and it was found out that it results in a complex mixture of compounds. It can therefore be assumed that the end product obtained is not pure cannabigerol but a mixture of cannabigerol, its structural isomer and further impurities. The reported yield of 52% is therefore not possible.

The publication by Mechoulam was cited by Taura (Taura: *The Journal of Biological Chemistry*, 1996, 29, 17411-17416) and in WO2014134281 A1 and WO2016030828 A1. The publication by Taura, however, is a biological article, which does not describe a synthesis or a reproduction of the synthesis according to Mechoulam. WO2014134281 A1 and WO2016030828 A1 relate to biotechnological processes for the production of cannabinoids and describe a reproduction of the synthesis according to Mechoulam as prior art. The reported yield of 36% after chromatography, however, does not provide a pure product according to the ICH guidelines but merely cannabigerol with a purity of >80%.

A further patent application describes the use of bromine as protection group for olivetol (2) in a Friedel-Crafts-Alkylation (WO2017011210 A1).

It was an objective of the present invention to solve the above mentioned problems and provide a method for producing cannabigerol in high purity, preferably >99%, in a time and cost effective way.

In particular, it was an objective of the present invention to provide a method for producing cannabigerol by chemical synthesis, which allows an efficient purification without the need for preparative chromatographic methods such as HPLC or column chromatography.

It was a further objective of the present invention to identify biological activities of cannabigerol, which can be used to achieve cosmetic and/or pharmaceutic effects.

In the context of the present invention, several different approaches were investigated in order to identify an efficient method for producing cannabigerol (see the examples). The different synthetic concepts are dealing with the natural limitations of the Friedel-Crafts-Alkylation. Targeting those enables a separation by non-chromatographic methods like distillation and crystallization.

The "disadvantage" of the polyalkylation can be taken advantage of due to the difference of the chemical properties (reactivity) of the product CBG (1) and the regioisomer (5). The goal is to derivatize exclusively the regioisomer which enables a better separation due to the increase in difference of the physical properties (e.g. boiling point) of the resulting polyalkylated compounds (10).

Scheme (2) Representation of using selective polyalklation for transforming the isomer (5), see example 4.

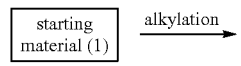

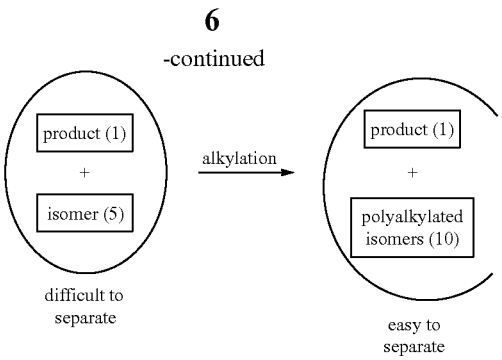

Preventing the formation of a regio isomer by blocking the wrong positions for alkylation can be realized by halogenation of a removable group blocking specific regio positions. This results in a limitation for the alkylation and therefore an increase in selectivity.

Scheme (3) Strategy of blocking unwanted positions, see examples 2 and 3.

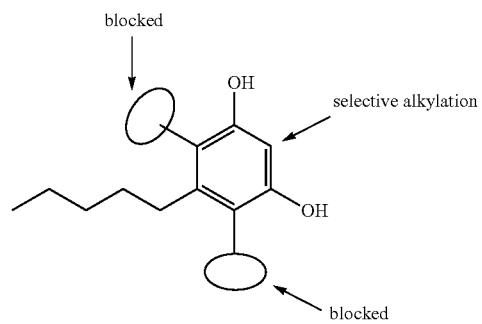

Due to the high electron density of the olivetol (2), a rapid alkylation takes place. To address this issue, experiments in continuous flow reactors were examined as well.

Besides the formerly shown synthetic concepts to obtain pure CBG (1), there is also the option to use non-standard separation techniques in combination with the standard Friedel-Crafts-Alkylation of olivetol (2) and geraniol (3) or linalool (4). For example, simulated Moving Bed (SMB) chromatography can be used for the separation of CBG (1) and the regioisomer (5). The separation of the two compounds (1) and (5) is not possible by distillation due to its similar (and high) boiling points. The success by using crystallization is dependent on the amount of CBG (1) and other impurities in the mixture. Therefore the SMB chromatography is an economical feasible approach (see example 6).

Enrichment of the CBG mixture to obtain pure CBG (1) with countercurrent chromatography followed by crystallization is also an option. A liquid-liquid extraction with the Centrifugal Partition Chromatography (CPC) enables the separation of Cannabigerol (1) and the regioisomer (5).

It was found, that the approach taking advantage of the polyalkylation was the economically most relevant resulting in high purity and good yields. An unexpectedly high selectivity for polyalkylation of the regioisomer compared to cannabigerol was observed, which allowed to obtain the product in a good yield and sufficient purity for subsequent crystallization.

According to the present invention, the above defined objectives are met by a method for producing cannabigerol comprising the steps:

(i) reacting olivetol with one or a mixture of two or more allylic compound(s) having a leaving group in the presence of an acidic or lewis acidic catalyst, and
(ii) purifying the product by distillation or liquid-liquid extraction, wherein the allylic compound having a leaving group or at least one of the allylic compounds having a leaving group is a compound of formula (I) and/or (II)

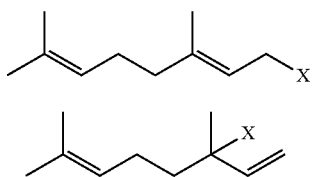

wherein X represents the leaving group

The leaving group X may be selected from a hydroxy, halogen, acetyl, carbamyl, carbonyl, tosyl or mesyl group.

Surprisingly, the selectivity for polyalkylation of the regioisomer compared to cannabigerol is so high that good product yields can be obtained and only a small amount of cannabigerol is lost due to polyalkylation. It was expected that due to the strong activation of the aromatic ring by the first Friedel-Crafts-Alkylation, any further alkylation would be controlled kinetically and thus all remaining open positions of the aromatic ring would react equally despite their different accessibility. However, unexpectedly, the steric effect was found to have such a large influence that the loss of yield due to polyalkylation of cannabigerol does not prevent an economically significant improvement with respect to conventional methods.

Thus, a process was established, in which cannabigerol can be obtained from olivetol by reaction with allylic compounds having a leaving group and purified from the reaction mixture by distillation or liquid-liquid extraction. This process allows to obtain cannabigerol in a purity of 40 to 80% providing the minimum required purity in order to be able to crystallize the product and thus obtain cannabigerol in a purity of >99% without the need for chromatographic purification.

In step (i) olivetol is reacted with one or a mixture of two or more allylic compounds having a leaving group. If olivetol is reacted with only one allylic compound this is either a compound of formula (I) or a compound of formula (II). In a preferred embodiment, the compound(s) of formula (I) and/or (II) is/are geraniol and/or linalool. If olivetol is reacted with two or more allylic compounds having a leaving group, the allylic compounds having a leaving group may be a mixture of a compound of formula (I) and a compound of formula (II) but they may also comprise other allylic compounds having a leaving group as defined in the following.

An allylic compound having a leaving group in the context of the present invention is a compound of the general formula (III):

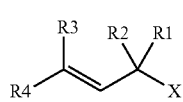

wherein X represents the leaving group. R1 to R4 are independently selected from hydrogen, branched or unbranched alkyl or allyl group with 1 to 20 carbon atoms, optionally comprising an aromatic or aliphatic ring or ring system. R1 to R4 may carry substituents comprising heteroatoms such as nitrogen, sulfur, oxygen or halogen. One, two, three or all of R1 to R4 may be part of a ring or a bridged ring system and, optionally, two or three of R1 to R4 may form a ring or bridged ring system together. Preferably, the allylic system, i.e. the allylic compound without the leaving group, comprises at least 5 and not more than 25 carbon atoms. The leaving group in the context of the present invention is a moiety, which can be cleaved from a molecule by heterolytic bond cleavage because it is capable of stabilizing the additional electron density. A leaving group may be selected from a hydroxy, halogen, acetyl, carbamyl, carbonyl, tosyl or mesyl group.

In particular, the allylic compound having a leaving group is represented by the general formula (IV) or (V)

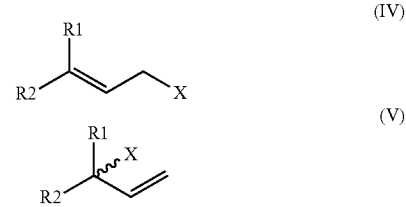

wherein X represents the leaving group as defined above and R1 and R2 are independently selected from branched or unbranched alkyl or allyl group with 1 to 20 carbon atoms, optionally comprising an aromatic or aliphatic ring or ring system and optionally carrying substituents comprising or heteroatoms such as nitrogen, sulfur, oxygen or halogen.

Preferably, one of R1 and R2 represents a methyl group and the other one of R1 and R2 represents a terpene or diterpene moiety.

Preferred allylic compounds having a leaving group are geraniol (3), linalool (4) or one of the compounds (22) to (26):

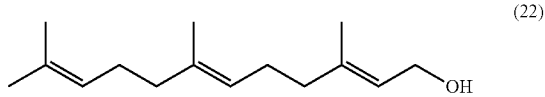

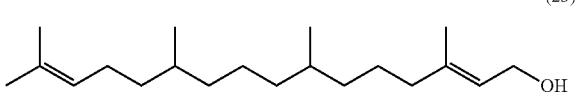

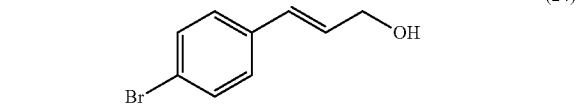

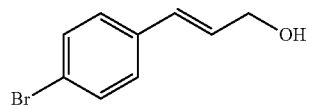

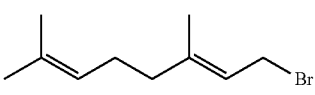

Further preferred allylic compounds are represented by the general formula (VI) or (VII):

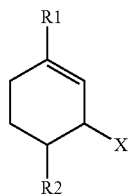
(VI)

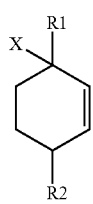
(VII)

wherein X is the leaving group as defined above and R1 and R2 are independently selected from hydrogen or an alkyl group with one to 3 carbon atoms, optionally substituted by a hydroxyl group, in particular

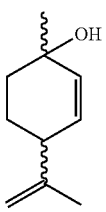
(13) including the stereoisomers and

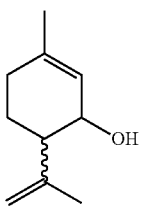
(27)

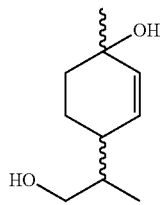
(28)

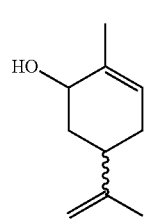
(29)

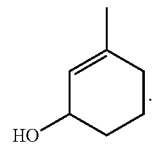
(30)

Further preferred allylic compounds are represented by the general formula (VIII):

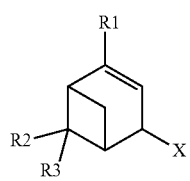
(VIII)

wherein X is a leaving group as defined above and R1 to R3 are independently selected from hydrogen or an alkyl group with one to 3 carbon atoms, optionally substituted by a hydroxyl group, in particular

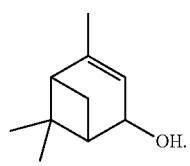
(31)

An acidic catalyst in the context of the present invention is a catalyst comprising a proton donor group. A lewis acidic catalyst in the context of the present invention is a catalyst comprising an electron acceptor group. Examples for suitable catalysts are given below.

Distillation allows to separate the components obtained in step (i) of the method described above by selective boiling and condensation. This is possible because the desired cannabigerol has a boiling point, which is significantly different from the boiling point of the side products of the reaction.

Liquid-liquid extraction allows to separate the components obtained in step (i) of the method described above based on their relative solubilities. A liquid-liquid extraction process may be performed as follows:

The raw product obtained in step (i) is combined with methanol and a corresponding amount of water. By addition of heptane, a distribution of CBG (1) and polyalkylated compounds (10) is obtained, in which the majority of the CBG (1) remains in the methanol phase and the impurity (10) is enriched in the heptane phase. The lower methanol phase is extracted with heptane three times to deplete compound (10) further. Subsequently, CBG (1) is extracted back. To this end, another defined amount of water is added so that the methanol phase becomes more polar. The extraction with cyclohexane results in depletion of CBG (1) in the methanol phase, whereby the majority of olivetol (2) remains in the methanol phase. The extraction with cyclohexane is repeated three times. Thus, a heptane phase with compound (10), a cyclohexane phase with CBG (+ further impurities) and a methanol phase with olivetol (2) is obtained in the end. Olivetol can be recycled by extraction with ethyl acetate for further use. The process is shown schematically in FIG. 1.

In particular, when olivetol is reacted with a molar excess of an allylic compound or a mixture of allylic compounds having a leaving group, polyalkylation products are formed primarily of the regioisomer and not of the cannabigerol. Surprisingly, the selectivity for the regioisomer so high that the loss of product is within an economically acceptable range. Due to their physical properties (boiling point and polarity), these polyalkylation products can be effectively separated from cannabigerol by distillation or liquid-liquid extraction.

In a preferred embodiment of the method described above, in step (i), olivetol is reacted with the one or the mixture of two or more allylic compound(s) having a leaving group at a molar ratio of from 1:1 to 1:2, preferably from 1:1.2 to 1:1.9 olivetol to allylic compound or, respectively, olivetol to the sum of the two or more allylic compounds.

It was found that the selectivity for the polyalkylation of the regioisomer (5) with respect to the desired cannabigerol is particularly high when a steric allylic compound is used as allylic compound in addition to the geraniol or linalool. Surprisingly, even using only slightly sterically more demanding allylic compounds compared to the compounds of Formula (I) or (II), such as e.g. menthadienol, an unexpectedly large improvement in selectivity was observed. Therefore, it is possible to obtain cannabigerol in even better yield and a higher purity in step (ii).

In a preferred embodiment of the method described above, step (i) therefore comprises the steps:
(ia) reacting olivetol with the compound of formula (I) and/or (II) as defined above at a molar ratio of from 1:0.5 to 1:1.2, preferably 1:0.9 to 1:1.1, and
(ib) reacting the mixture of step (ia) with a steric allylic compound having a leaving group at a molar ratio of 0.2:1 to 1:1, preferably 0.3:1 to 0.5:1 of steric allylic compound to the olivetol used in step (ia), wherein the allylic residue of the steric allylic compound having a leaving group comprises at least 5 carbon atoms, wherein in case the allylic compound comprises 10 or less carbon atoms it includes a ring or a bridged ring system.

In a preferred embodiment of the method described above, olivetol is reacted with the sum of the compound of formula (I) and/or (II) as defined above and the steric allylic compound having a leaving group at a molar ratio of from 1:1 to 1:2, preferably from 1:1.2 to 1:1.9 olivetol to the sum the compound of formula (I) and/or (II) as defined above and the steric allylic compound having a leaving group.

In a preferred embodiment, the allylic compound of formula (I) and/or (II) is/are geraniol and/or linalool.

Steps (ia) and (ib) can be performed subsequently or, both, geraniol or linalool and the steric allylic compound having a leaving group can be added simultaneously.

The steric allylic compound having a leaving group in the context of the present invention is a compound of formula (III) as defined above and comprises an allylic residue with at least 5 carbon atoms, wherein in case the allylic residue comprises 10 or less carbon atoms it includes a ring or a bridged ring system. The leaving group of the steric allylic compound may be selected from a hydroxy, halogen, acetyl, carbamyl, carbonyl, tosyl or mesyl group.

The steric allylic compound is preferably selected from a compound of the general formula formula (IV) or (V)

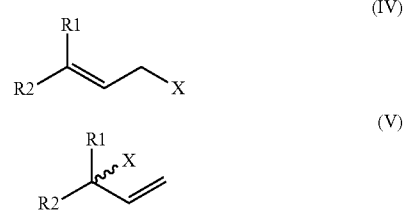

as defined above, wherein in case the allylic residue comprises 10 or less carbon atoms it includes a ring or a bridged ring system. In a preferred embodiment, one of R1 and R2 represents a methyl group and the other one of R1 and R2 represents a terpene or diterpene moiety with 7 or more carbon atoms.

Preferred steric allylic compounds are

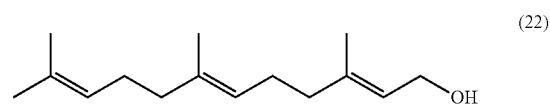

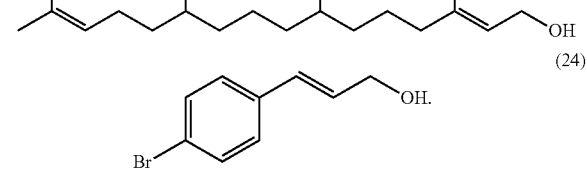

Further preferred steric allylic compounds are compounds of the general formula (VI) or (VII):

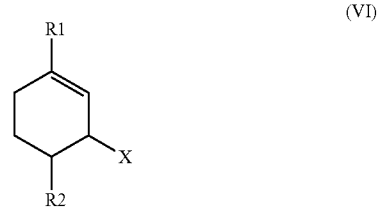

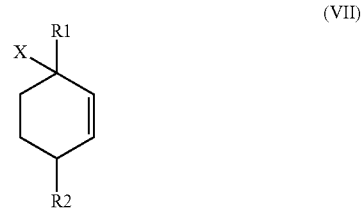

wherein X is the leaving group as defined above and R1 and R2 are independently selected from hydrogen or an alkyl group with one to 3 carbon atoms, optionally substituted by a hydroxyl group, in particular

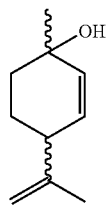

(13) including the stereoisomers and

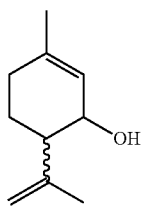
(27)

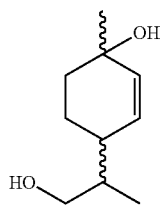
(28)

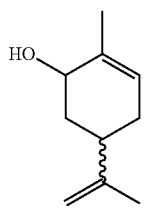
(29)

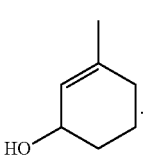
(30)

Further preferred steric allylic compounds are represented by the general formula (VIII):

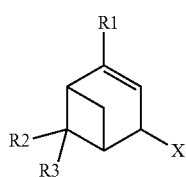
(VIII)

wherein X is a leaving group as defined above and R1 to R3 are independently selected from hydrogen or an alkyl group with one to 3 carbon atoms, optionally substituted by a hydroxyl group, in particular

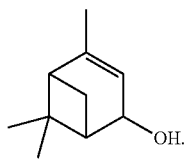
(31)

In a preferred embodiment, the allylic compound of formula (I) and/or formula (II) is geraniol and/or linalool and the steric allylic compound is menthadienol.

When using menthadienol as the steric allylic compound, a large improvement in selectivity can be observed, which is particularly surprising as menthadienol has an overall similar structure to e.g. geraniol, the difference merely being that menthadienol is cyclic.

If the steric allylic compounds described above are used in the method according to the invention, the regioisomer (5) is polyalkylated with a high selectivity resulting in good yields of the desired cannabigerol and allowing an efficient separation of the side products, which leads to a high purity of the product. In particular, for steric allylic compounds having a ring or ring system, such as menthadienol and its isomers, a high selectivity for the regioisomer (5) was observed. Surprisingly, this results almost exclusively in polyalkylation of the regioisomer so that no or very little product is lost.

In another preferred embodiment of the method described above, step (i) is conducted as a batch or, preferably as a continuous flow reaction process.

In a further preferred embodiment of the method described above, the acidic or lewis acidic catalyst is selected from the group consisting of p-TsOH, formic acid, acetic acid, butyric acid, oxalic acid, phosphoric acid, sulfuric acid, benzoic acid, $AlCl_3$, $ZnCl_2$, $FeCl_3$, $AlBr_3$, $(CF_3SO_3)_2Zn$, $BF_3*Et_2O$, $BF_3*2CH_3COOH$, $BF_3*CH_3OH$, $BF_3*THF$, $CH_3SO_3H$ and aluminium isopropoxide.

Para toluene sulfonic acid was found to represent a cheap and easy to handle catalyst, which provides surprisingly good results.

The method described above may further comprise the step (iii) crystallizing the product obtained in step (ii).

The method as described in any of the embodiments above, allows to provide cannabigerol in a purity, which is sufficient for crystallization, i.e. 40 to 80%. This is considered surprising because the regioisomer present in the product obtained in step (ii) is expected to prevent a clean crystallization of cannabigerol. By performing the crystallization step (iii) a purity of >99% cannabigerol can be achieved. Thus, it is possible to provide cannabigerol in high purity in a cost efficient manner without the need for chromatographic methods.

The present invention also relates to the cosmetic use of cannabigerol or a salt thereof for the inhibition of tyrosinase activity and/or the reduction of melanin production in the skin, in particular for reducing pigmentation of the skin, preferably for the improvement of the appearance of the skin in case of hyperpigmentation, lentigo or vitiligo.

Figure 2:
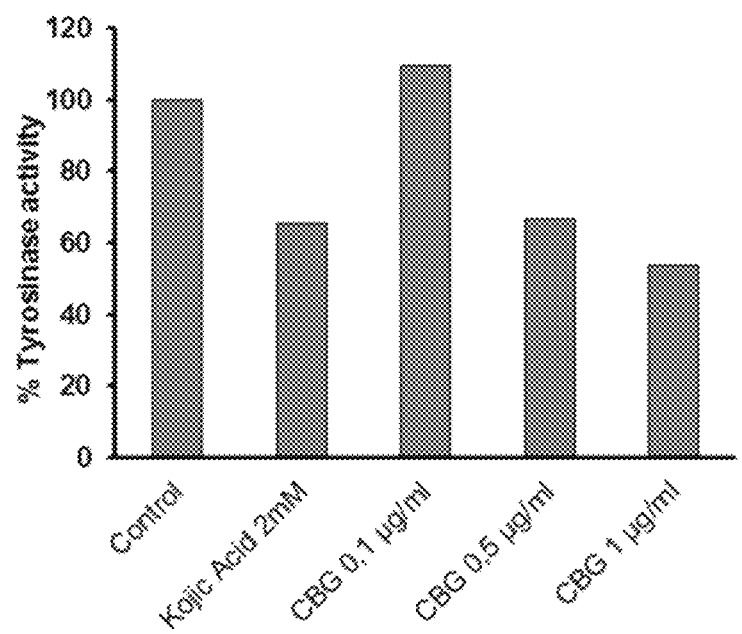

It was found out in the context of the present invention by biological studies, that cannabigerol has a surprisingly high inhibitory effect on tyrosinase activity, which is essential for melanin production in the skin (Solem et al., *Angewandte Chemie*, 2016, 15, 2884-2888). Tyrosinase converts monophenols to chinones in the body, which subsequently combine to melanin. In the used test systems, cannabigerol showed a stronger inhibition than the used reference inhibitor kojic acid, a prominent tyrosinase inhibitor (FIG. 2 und 3). This has to be considered surprising, in particular because endocannabinoids like e.g. anandamid (AEA) increase melanin production (Pucci et al. *Journal of biological chemistry*, 2017, 287 (19), 15466-15478).

Consequently, cannabigerol can be used cosmetically to reduce skin pigmentation in order to improve the appearance of the skin. Hyperpigmentation results in dark areas or spots on the skin. The darkening is caused by an increased melanin production with respect to the surrounding area. Lentigo is represented by dark spots on the skin with a clearly defined edge, while vitiligo refers to low or no pigmentation in certain skin areas, which can present a noticeable contrast against the surrounding skin color. The irregularly distributed pigmentation and resulting spotted skin appearance may represent a serious cosmetic problem. Therefore, a reduction of pigmentation in certain areas may be desirable in order to achieve a more even skin appearance.

The present invention therefore also relates to a cosmetic composition comprising cannabigerol or a salt thereof, preferably for application on the skin.

Advantageously, cannabigerol can be worked e.g. into a lotion or a creme to be applied on the skin in places where a reduction of pigmentation is desired. Thus, a more even skin appearance can be achieved.

It was suggested by Demopoulos et al. in 1965 already, that tyrosinase may be necessary for the growth of melanoma melanocytes and that selective inhibition of growth of melanomas could be achieved by tyrosinase inhibitors (Demopoulos et al., *J Nat Cancer Inst.*, 1965, 35, 823-827). The modulation of melanogenesis by aloesin, a competitive inhibitor of tyrosinase, is described in Jones et al., *Pigment Cell Res.*, 2002, 15, 335-340). Uchida et al. investigated tyrosinase inhibitory activities of 2-hydroxytyrosol and melanin formation in mouse melanoma cells. They concluded that 2-hydroxytyrosol is a promising lead compound for the treatment of skin pigmentation disorders (Uchida et al., *Acta Pharmaceutica Sinica B*, 2014, 4(2), 141-145). Slominski et al. describe in *Arch Biochem Biophys.*, 2014, 563, 79-93, that melanogenesis stimulates expression of HIF-1α and that advanced melanomas show increased expression of HIF-1α. While melanin pigment on the one hand protects melanocytes against UVR and oxidative stress, it can, on the other hand, accelerate melanoma's progression (Slominski et al., *Experimental Dermatology*, 2015, 24, 258-259). In Rao et al. (*Journal of Agricultural and Food Chemistry*, 2013, 61, 3842-3851) it is explained in the abstract, that high levels of tyrosinase lead to characteristic symptoms of skin pigmentation and tumor initiation. It follows that inhibition of tyrosinase can prevent the development or progression of skin cancer.

The present invention therefore also relates to cannabigerol or a salt thereof for use in a therapeutic method for the inhibition of tyrosinase activity and/or the reduction of melanin production in the skin, preferably for use in a therapeutic method for the treatment and/or prevention of malign skin disorders.

In a preferred embodiment, the present invention provides cannabigerol or a salt thereof for use in the treatment and/or prevention of skin cancer.

SHORT DESCRIPTION OF THE FIGURES

Figure 3:
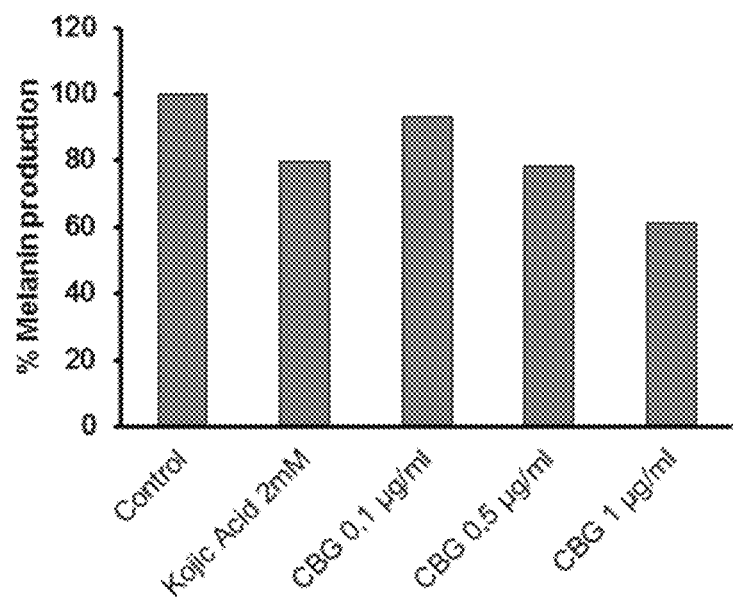

FIG. 1: Schematic overview of the extraction process
FIG. 2: Biological effects of cannabigerol (CBG) on tyrosinase activity in B16 melanocytes.
FIG. 3: Biological effects of cannabigerol (CBG) on melanin production in B16 melanocytes.

EXAMPLE 1: PRODUCTION OF OLIVETOL

Olivetol methyl ester (6) with the IUPAC name of methyl 2,4-dihydroxy-6-pentyl-benzoate is the starting material for all synthetic approaches.

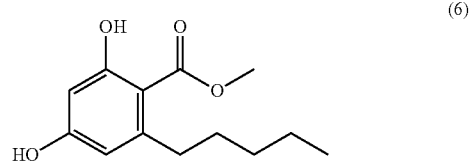 [SMILES: CCCCCc1cc(O)cc(O)c1C(=O)OC]

(6)

Olivetol (2) is obtained by saponification with subsequent decarboxylation from olivetol methyl ester (6). The saponification is done under basic conditions with potassium hydroxide in water. Solvation problems of the staring material in the beginning disappear after warming up to 50-60° C. The reaction is refluxed for 3 h with a constant separation of the generated methanol by distillation. Polymerisation can be prevented by a short heating period and high concentration. The obtained raw product can be purified by distillation to give a white/yellow solid with an overall yield of 94% and a purity of 99.4%. (Scheme 4)

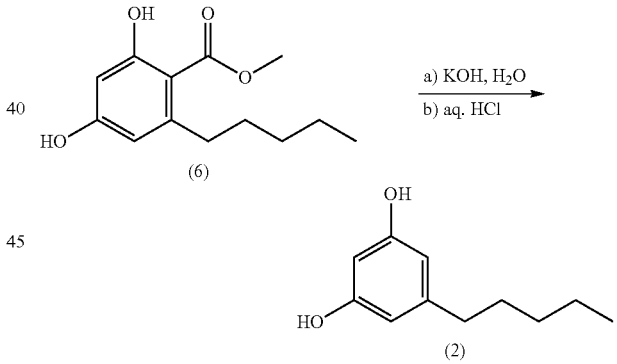

Scheme (4) Saponification/decarboxylation of Olivetol methyl ester (6) to Olivetol (2).

A suspension of olivetol methyl ester (6) (200 g, 839 mmol, 1.00 eq.), KOH (226 g, 4.03 mol, 4.80 eq.) in 600 ml of water was stirred at 400 rpm (exothermic). After solvation at 50-60° C. the reaction solution turned yellow/red. The resulting solution was stirred at 95-100° C. for 2.5 h and monitored by HPLC. After complete saponification the reaction was cooled to 20° C. and 400 mL water and 400 mL ethyl acetate were added. A pH of 4-5 was adjusted with conc. HCl (300 g in 200 mL water). The extensive foam production due to the $CO_2$ development was reduced by the ethyl acetate. After extraction with ethyl acetate, the combined organic phase was washed with brine, dried over sodium sulfate and concentrated in vacuo to give the crude product. The residue was purified by distillation (1.7 mbar 150° C.) to give olivetol (2) (slight yellow solid, 142 g, 94% yield).

$R_f$: 0.67 (1:1 ethyl acetate/cyclohexane) Anisaldehyde $^1$H NMR (400 MHz, Chloroform-d) δ=6.23 (d, J=2.1 Hz, 2H), 6.15 (t, J=2.2 Hz, 1H), 5.05 (brs, 2H, OH), 2.38 (dd, J=8.9, 6.7 Hz, 2H), 1.48 (p, J=7.2 Hz, 2H), 1.34-1.15 (m, 4H), 0.84 (t, J=6.9 Hz, 3H) ppm.

$^{13}$C NMR (101 MHz, Chloroform-d) δ=156.2, 146.4, 108.2, 100.2, 35.8, 31.5, 30.7, 22.5, 14.0 ppm.

EXAMPLE 2: INCREASING THE REGIO SELECTIVITY BY BLOCKING ONE POSITION BY AN ESTER

In a strategic attempt to minimize the competitive alkylation at the regio position, olivetol methyl ester (6) was used as a starting material in the Friedel-Crafts-Alkylation. The ester function blocks one unwanted reaction center. This leads to a smaller amount of the regio isomer (16) and is resulting in less regioisomer (5) after saponification and decarboxylation. The complete suppression of the regio isomer could not be achieved as well as other accumulating byproducts made a separation more challenging. Complete conversion of the starting material could not be achieved. Extra addition of catalyst as well as allylic alcohol (3) brought negligible progress. (Scheme 5)

The first reaction step of the Friedel-Crafts-Alkylation is done with boron trifluoride etherate and geraniol (3) in dichloromethane. Due to the impurities several separation techniques were used. At first the crude product was purified by distillation from the low boiling remains of geraniol (3) as well as of the high boiling polyalkylated byproducts. Two flash silica gel column chromatographies and one crystallization enabled to obtain the pure cannabigerol methyl ester (7) in a pure form with an overall yield of 6%.

Scheme (5) Alkylation and saponification with subsequent decarboxylation

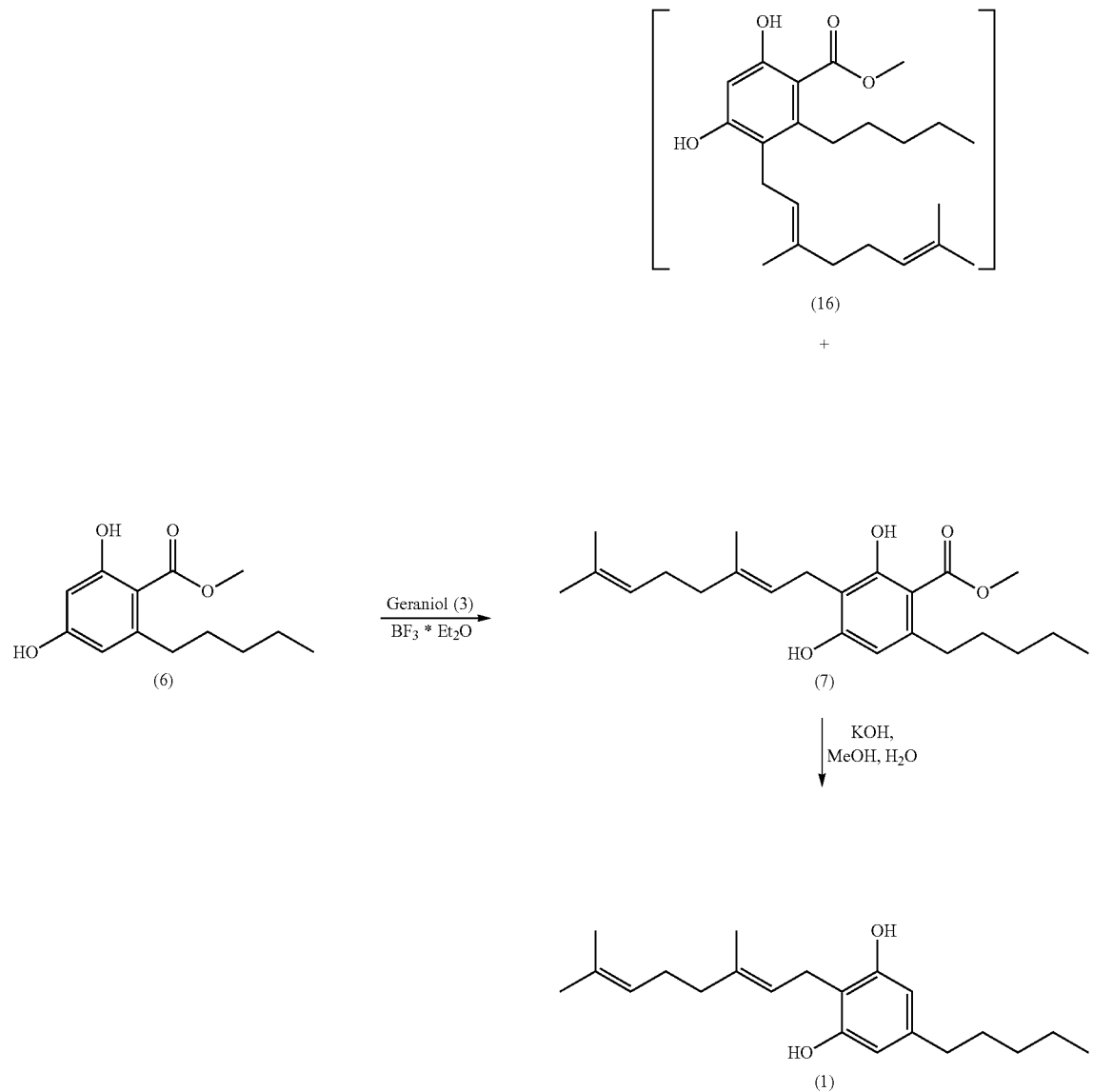

The saponification and decarboxylation of the cannabigerol methyl ester (7) was established under basic conditions with potassium hydroxide in methanol/water.

Alkylation:

To a solution of olivetol methyl ester (6) (5.00 g, 21.0 mmol, 1.00 eq.) and geraniol (3) (10.0 g, 64.8 mmol, 3.08 eq.) in 100 mL dichloromethane was added boron trifluoride etherate (2.98 g, 3 mL, 21.0 mmol, 1.00 eq.) at 22° C. over 1.5 h under vigorous stirring. Simultaneously to the addition of the catalyst, three portions of geraniol (3×2.00 g, 19.5 mmol, 1.08 eq.) were added (distributed over that time). The reaction was quenched by adding aq. NaOH (1 M, 200 mL) and vigorously stirred for 30 min. The organic phase was separated and the aqueous phase extracted with ethyl acetate (3×100 mL). The combined organic layer was washed with brine, dried over sodium sulfate and concentrated in vacuo to give the crude product. The crude mixture was purified by distillation (Kugelrohr distillation 0.4 mbar, 200-280° C.). The product fraction (7) was further purified by two flash column chromatography's (gradient: cyclohexane->3:7 cyclohexane: ethyl acetate) to obtain a yellow oil (487 mg, 1.30 mmol, 6% yield).

$^1$H NMR (400 MHz, Chloroform-d) δ=12.02 (s, 1H), 6.23 (s, 1H), 5.92 (s, 1H), 5.31-5.23 (m, 1H), 5.08-5.01 (m, 1H), 3.91 (s, 3H), 3.43 (d, J=7.1 Hz, 2H), 2.83-2.77 (m, 2H), 2.14-2.01 (m, 4H), 1.82-1.78 (m, 3H), 1.69-1.65 (m, 3H), 1.59 (s, 3H), 1.56-1.47 (m, 2H), 1.37-1.29 (m, 4H), 0.93-0.87 (m, 3H) ppm.

$^{13}$C NMR (101 MHz, Chloroform-d) δ=172.5, 162.5, 159.5, 145.8, 138.9, 132.0, 123.8, 121.5, 111.5, 110.8, 104.5, 51.8, 39.7, 36.8, 32.1, 31.6, 26.4, 25.7, 22.5, 22.1, 17.7, 16.2, 14.1 ppm.

Saponification/Decarboxylation:

KOH (540 mg, 9.16 mmol, 8.00 eq.) was dissolved in water (5 ml). Cannabigerolic ester (7) (450 mg, 1.20 mmol, 1.00 eq.) was dissolved in methanol (0.5 mL) and added to the solution. The resulting red/yellow solution was stirred at 95-100° C. for 3 h and monitored by HPLC. The added and newly developing methanol was distilled off during the process. After complete saponification the reaction was cooled to 25° C. and additional water (50 mL) and ethyl acetate (50 mL) were added. A pH of 3 was adjusted with conc. hydrochloric acid. After extraction with ethyl acetate, the combined organic phase was washed with brine, dried over sodium sulfate and concentrated in vacuo to give the crude product. The residue was purified by silica column chromatography to give cannabigerol (1) (191 mg, 0.60 mmol, 50% yield) as a slightly yellow/white solid.

$R_f$: 0.52 (1:1 cyclohexane/ethyl acetate) KMnO$_4$ $^1$H NMR (600 MHz, Chloroform-d) 5=6.24 (s, 2H), 5.27 (th, J=7.1, 1.3 Hz, 1H), 5.07 (s, 2H), 5.05 (thept, J=7.0, 1.4 Hz, 1H), 3.39 (d, J=7.1 Hz, 2H), 2.48-2.41 (m, 2H), 2.13-2.08 (m, 2H), 2.08-2.03 (m, 2H), 1.81 (q, J=1.0 Hz, 3H), 1.67 (q, J=1.2 Hz, 3H), 1.59 (d, J=1.3 Hz, 3H), 1.58-1.53 (m, 2H), 1.36-1.25 (m, 4H), 0.88 (t, J=7.0 Hz, 3H) ppm.

$^{13}$C NMR (151 MHz, Chloroform-d)=δ 154.8, 142.8, 138.9, 132.1, 123.8, 121.7, 110.6, 108.4, 39.7, 35.5, 31.5, 30.8, 26.3, 25.7, 22.6, 22.3, 17.7, 16.2, 14.0 ppm.

EXAMPLE 3: INCREASING THE REGIO SELECTIVITY IN BLOCKING ALL UNWANTED POSITIONS BY HALOGENATION

In this strategic attempt to block the wrong regio position in favor of a selective alkylation, halogens can be used. Bromine is preferred due to its unproblematic substitution. In terms of the reactivity, bromine has a reactivity advantage over SO$_3$H, NO$_2$, COOH, COOMe (see example 2). Bromine is a substituted first order and is only slightly deactivating the aromatic ring and therefore the alkylation. The reversibility of the bromination in the presence of acceptor groups enables its usage as a protecting group (Effenberger: *Angew. Chem.*, 2002, 114). (Scheme 6)

Scheme (6) Strategy of blocking unwanted regio positions.

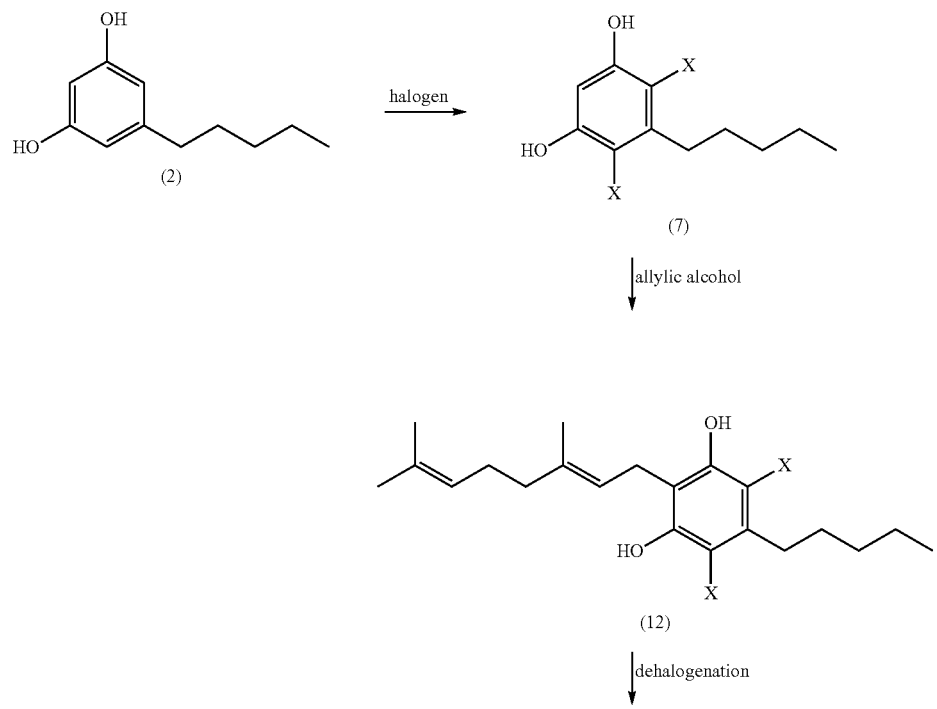

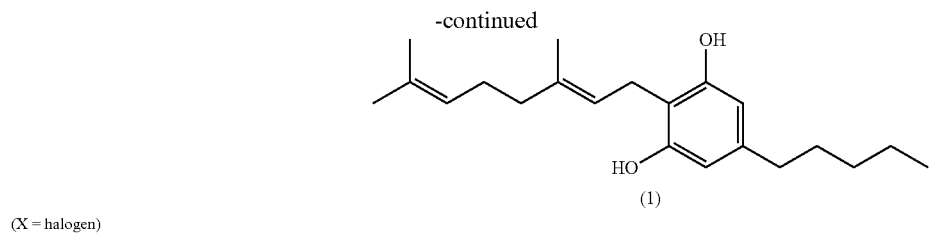

(X = halogen)

Bromination of Olivetol (2) (WO2017/011210 A1)

The selective double bromination of olivetol (2) with bromine in dichloromethane proceeds selectively at cold temperatures. A limitation of cooling below −30° C. is the solubility of the olivetol (2). After crystallization a pure dibrominated olivetol (8) could be obtained in a yield of 73%. (Scheme 7)

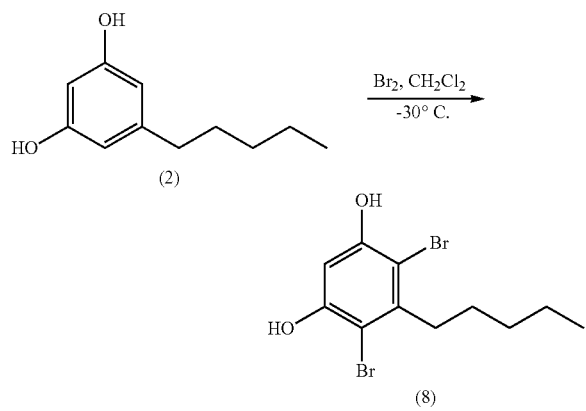

To a solution of olivetol (2) (20.0 g, 111 mmol, 1.00 eq.) in 600 mL dichloromethane was added bromine (35.5 g, 11.4 mL, 222 mmol, 2.00 eq.) at −28 to −30° C. for 30 min. After additional 15 min of stirring the reaction was quenched by addition of sodium bicarbonate (200 mL) and the mixture was allowed to warm up to rt. Brine (200 mL) was added and the phases were separated. The aqueous phase was extracted with dichloromethane (2×100 mL). The combined organic phase was dried over sodium sulfate and concentrated in vacuo to give the raw product. The solid raw product was dissolved by heating in heptane (150 mL) and crystallized at −15° C. The obtained white crystalline solid product (8) (27.4 g, 81.0 mmol, 73%) was directly used in the next reaction step.

Rf: 0.53 (1:1 ethyl acetate/cyclohexane) KMnO$_4$ $^1$H NMR (400 MHz, Chloroform-d)=δ 6.65 (s, 1H), 5.66 (s, 2H), 2.96-2.89 (m, 2H), 1.54 (dddd, J=8.5, 5.5, 2.1, 1.1 Hz, 2H), 1.47-1.33 (m, 4H), 0.96-0.90 (m, 3H) ppm.

$^{13}$C NMR (101 MHz, CDCl3) δ=152.6, 141.4, 104.1, 100.7, 37.6, 31.8, 27.7, 22.4, 14.0 ppm.

Friedel-Crafts-Alkylation of Brominated Olivetol (2):

The alkylation was done with the brominated olivetol (8) and geraniol (3). Three successful procedures are shown in Scheme 8. They differ in the choice of the catalyst and the reactor type and therefore the method of operation (batch and continuous reactions).

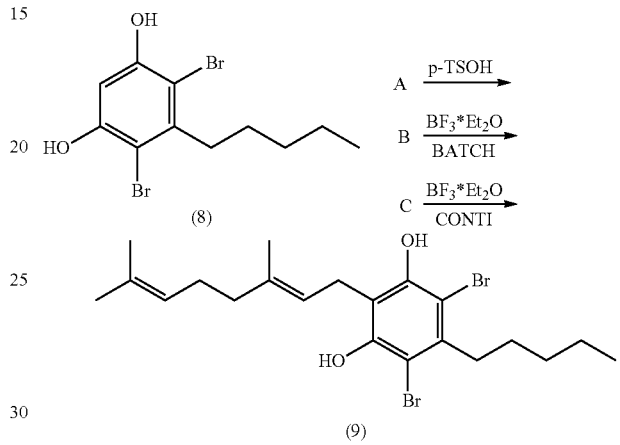

Due to the slight deactivation of the aromatic ring by the two bromines the reaction under acidic catalysis with p-TsOH proceeded slowly (example A). The conversion of the starting material in this case took a week and gave the wanted product (9) after chromatography in a yield of 44%. The use of a strong lewis acid as boron trifluoride etherate enables a rapid transformation in 30 min of the starting material towards the product (example B). The downside to this approach was the higher amount of byproducts. After chromatography the pure product (9) could be obtained in 22% yield. The fast transformation with a strong lewis acid was repeated in a continuous reaction environment, which led to an improvement (example C) in yield.

A:

To a solution of brominated olivetol (8) (2.00 g, 5.92 mmol, 1.00 eq.), geraniol (3) (1.64 g, 10.7 mmol, 1.80 eq.) in 200 mL dichloromethane was added at rt p-TsOH (51 mg, 0.29 mmol, 0.05 eq.). The solution was stirred for 7 days and quenched by addition of brine (150 mL). The layers were separated and the organic layer was washed with brine. The organic layer was dried over sodium sulfate and concentrated in vacuo to give the crude product. After purification by silica flash column chromatography (gradient: cyclohexane/ethyl acetate) the pure product (1.24 g, 2.61 mmol, 44%) could be obtained as slightly yellow solid.

B:

To a solution of brominated olivetol (8) (10.0 g, 29.5 mmol, 1.00 eq.), geraniol (3) (13.7 g, 88.7 mmol, 3.00 eq.) in 200 mL dichloromethane at 15° C. was added boron trifluoride etherate (2.27 g, 2.0 mL, 16.0 mmol, 0.54 eq.) over 25 min. The solution was stirred for 10 min and then quenched by the addition of NaOH (100 ml, 1 M). The layers were separated and the organic layer was washed with brine. The organic layer was dried over sodium sulfate and concentrated in vacuo to give the crude product. After purification by silica flash column chromatography (gradient: cyclohexane/ethyl acetate) the pure product (3.15 g, 6.64 mmol, 22%) could be obtained as slightly yellow solid.
C:

A continuous reactor with a volume of 18 mL was fed with starting material solution A and catalyst solution B. The starting material solution A contained brominated olivetol (8) (5.00 g, 14.7 mmol, 1.00 eq.) and geraniol (3) (2.97 g, 19.2 mmol, 3.34 eq.) in 40 ml dichloromethane. The catalyst solution B contained boron trifluoride etherate (1.26 mg, 8.87 mmol, 0.60 eq.) in 40 mL dichloromethane.

Starting material solution A was pumped with 24 mL/min and catalyst solution B was pumped with 12 ml/min while the reaction was stirred at 1300 rpm. The reaction mixture left the reactor with a flow of 36 ml/min through a 1.5 m long PTFE-hose (20 mL volume) into a aq. sat. sodium bicarbonate solution.

The quenched mixture was stirred for 15 min. Cyclohexane (150 mL) was added and the phases were separated. The aqueous phase was extracted twice with cyclohexane. The combined organic phase was dried over sodium sulfate and concentrated in vacuo. The crude product was purified by silica flash column chromatography and gave the product (9) (2.24 g, 4.72 mmol, 32%) as a yellow solid.

$R_f$: 0.64 (1:10 ethyl acetate/cyclohexane) $KMnO_4$ $^1$H NMR (400 MHz, Chloroform-d) δ=5.78 (s, 2H), 5.23 (tq, J=7.1, 1.3 Hz, 1H), 5.05 (tdt, J=5.8, 2.9, 1.4 Hz, 1H), 3.49-3.44 (m, 2H), 2.93-2.86 (m, 2H), 2.12-2.03 (m, 2H), 2.03-1.96 (m, 2H), 1.79 (d, J=1.3 Hz, 3H), 1.65 (t, J=1.4 Hz, 3H), 1.57 (d, J=1.3 Hz, 3H), 1.56-1.48 (m, 2H), 1.39 (ttd, J=7.2, 4.0, 3.1, 1.6 Hz, 4H), 0.96-0.88 (m, 3H) ppm.

$^{13}$C NMR (101 MHz, CDCl3) δ=150.3, 138.3, 137.1, 131.5, 124.1, 121.0, 113.5, 104.3, 39.7, 37.5, 31.8, 27.9, 26.6, 25.7, 24.4, 22.4, 17.7, 16.2, 14.0 ppm.

Dehalogenation

A dehalogenation strategy was used to obtain the product cannabigerol (1) from the halogenated species (9) by heating the intermediate (9) in the presents of sodium sulfite, ascorbic acid and a base. (Scheme 9)

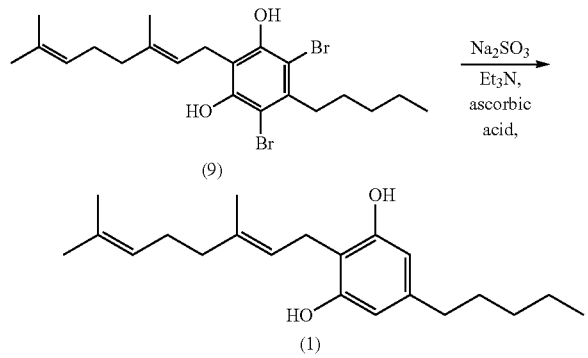

Scheme (9) Dehalogenation towards CBG (1).

To a solution of brominated CBG (9) (750 mg, 1.58 mmol, 1.00 eq.) in methanol (10 mL) was added a solution of sodium sulfite (1.99 g, 15.8 mmol, 10.0 eq.) and ascorbic acid (50 mg, 0.32 mmol, 0.20 eq.) in water (10 mL). Triethylamine (0.80 g, 1.1 mL, 7.90 mmol, 5.00 eq.) was added to the brown milky mixture which turned purple. The mixture was refluxed for 24 h and quenched by adding HCL (1M) at rt, followed by ethyl acetate (100 mL) and brine (100 ml). The phases were separated and the aqueous phase was extracted with ethyl acetate (3×30 mL). The combined organic layers were dried over sodium sulfate and concentrated in vacuo to give the crude product. The crude product (1) was purified by silica flash column chromatography (1:20 ethyl acetate/cyclohexane) to give a white solid product (261 mg, 0.82 mmol, 52%).

$R_f$: 0.52 (1:1 cyclohexane/ethyl acetate) $KMnO_4$ $^1$H NMR (600 MHz, Chloroform-d) δ=6.24 (s, 2H), 5.27 (th, J=7.1, 1.3 Hz, 1H), 5.07 (s, 2H), 5.05 (thept, J=7.0, 1.4 Hz, 1H), 3.39 (d, J=7.1 Hz, 2H), 2.48-2.41 (m, 2H), 2.13-2.08 (m, 2H), 2.08-2.03 (m, 2H), 1.81 (q, J=1.0 Hz, 3H), 1.67 (q, J=1.2 Hz, 3H), 1.59 (d, J=1.3 Hz, 3H), 1.58-1.53 (m, 2H), 1.36-1.25 (m, 4H), 0.88 (t, J=7.0 Hz, 3H) ppm.

$^{13}$C NMR (151 MHz, Chloroform-d)=δ 154.8, 142.8, 138.9, 132.1, 123.8, 121.7, 110.6, 108.4, 39.7, 35.5, 31.5, 30.8, 26.3, 25.7, 22.6, 22.3, 17.7, 16.2, 14.0 ppm.

EXAMPLE 4: DIRECT SYNTHESIS OF CANNABIGEROL (1)

In a direct synthesis of cannabigerol (1) via a Friedel-Crafts-Alkylation, olivetol (2) is alkylated with geraniol (3) or linalool (4) under acidic or lewis acid catalysis. The resulting product mixture can contain the product CBG (1), regio isomer (5), polyalkylation byproducts, remaining starting material (2) and minor impurities. It is a complex mixture which requires more than one separation technique, when chromatography should be excluded (due to costs).

Main Strategy Using Menthadienol (13) for Derivatization of the Byproduct

Olivetol (2) alkylated with equimolar amounts of geraniol (3) under catalysis of p-TsOH in toluene gives CBG (1) and the regio isomer (5) as the main compound. The product and byproduct are formed in a 1:1 ratio. Remaining olivetol (2) can be separated by extraction.

This CBG-(1)-regioisomer (5)-mixture is the starting point of this strategy. The regio isomer (5) and CBG (1) are similar in their physical properties (e.g. boiling point, polarity), which prevents the use of distillation and extraction techniques.

However, the chemical properties can be differentiated through chemical reaction like alkylations. The regioisomer (5) bears the geranyl and pentyl residue on the same side and leaves an open space for a second alkylation. This is used to derivatize the regioisomer into a polyalkylation product. This polyalkylation was done with menthadienol (13) under p-TsOH catalysis in toluene. Menthadienol (13) is a sterically hindered allylic alcohol, which leads to an excellent selective alkylation of the regioisomer (5) and hardly any alkylation of the CBG (1). This reaction step provides CBG (1) and byproducts which can be separated by a normal distillation step. A further crystallization step gives the pure product in overall yield of 13%.

Scheme (10) Synthesis with the bulky allylic menthadienol (13)

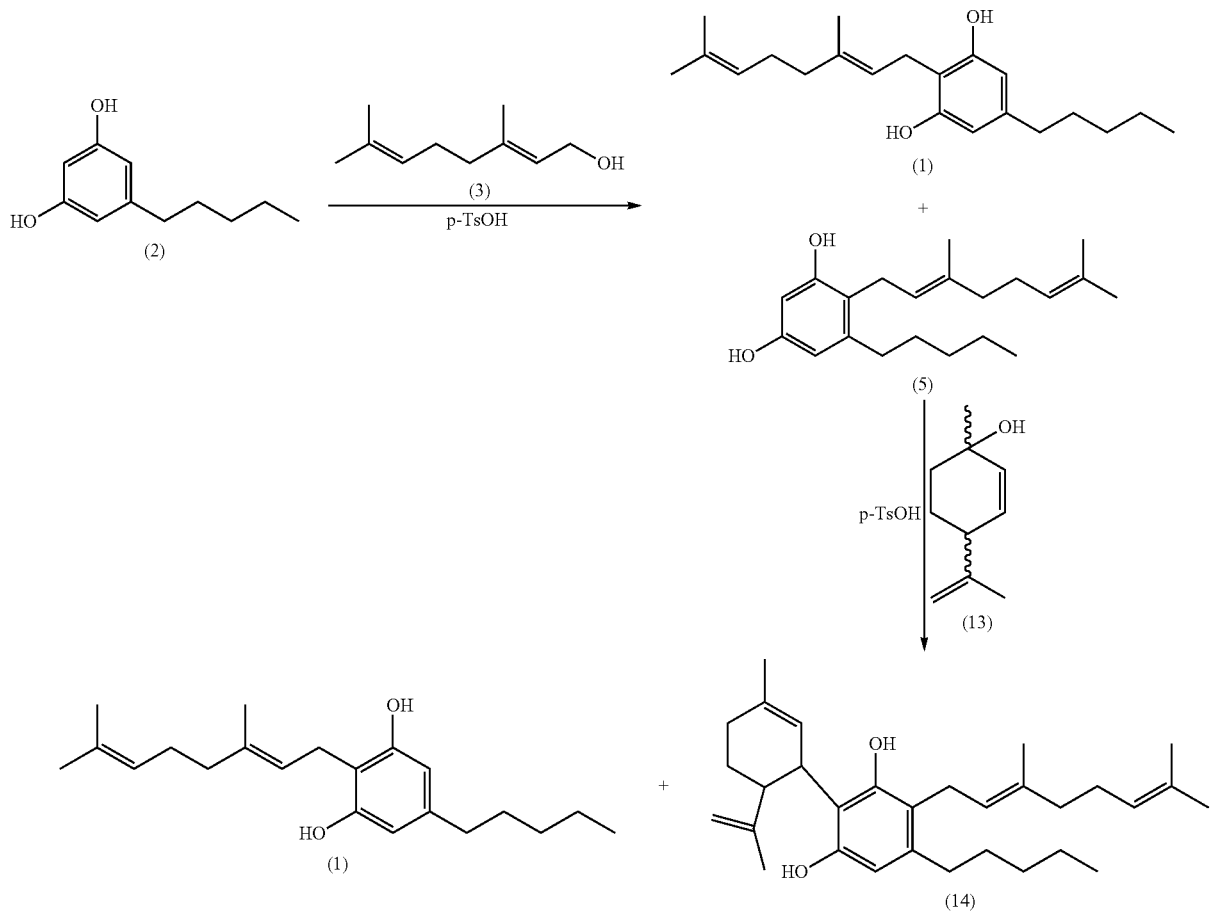

To a solution of olivetol (2) (20.0 g, 111 mmol, 1.00 eq.) and geraniol (3) (17.1 g, 111 mmol, 1.00 eq.) in 200 mL toluene was added p-TSOH (1.91 g, 11.1 mmol, 0.10 eq.) at 20° C. The solution was stirred at 400 rpm for 30 min. The reaction was quenched by adding aq. sat. sodium bicarbonate (100 mL) and brine (100 mL). The organic phase was separated and the aqueous phase extracted with toluene (2×100 mL). The combined organic layer was dried over sodium sulfate and concentrated in vacuo to give the crude product. The crude mixture was separated from the remaining starting material by extraction. Therefore, the raw product was dissolved in methanol (300 mL), brine (100 mL), water (40 mL) and was extracted with cyclohexane (5×50 mL). The combined cyclohexane layers were dried over sodium sulfate. The obtained product mixture was directly subjected to the next step reaction without further purification.

To the solution of product mix (31.9 g, 34% CBG (1), 24% regioisomer (5)) and menthadienole (13) (3.83 g, 25.2 mmol) in 200 mL toluene was added p-TSOH (1.73 g, 10.1 mmol) at 15° C. The solution was stirred at 500 rpm for 15 min. The reaction was quenched by adding aq. sat. sodium bicarbonate (100 mL) and brine (100 mL). The organic phase was separated and the aqueous phase extracted with toluene (2×100 mL). The combined organic layer was subjected to sodium hydroxide solution (100 mL, 1M) and stirred vigorously for 15 min. The phases were separated and the organic phase was dried over sodium sulfate and concentrated in vacuo to give the crude product. The crude product was distillated (0.4 mbar, 190-200° C.), the product fraction (13.3 g) was dissolved in heptane (15 ml) and crystallized at −20° C. The mother liquid was partly condensed and subjected to two additional crystallizations. The combined product (1) was a white crystalline powder (4.49 g, 14.2 mmol, 13%) with a purity >97%.

$R_f$: 0.52 (1:1 cyclohexane/ethyl acetate) KMnO$_4$ $^1$H NMR (600 MHz, Chloroform-d) δ=6.24 (s, 2H), 5.27 (th, J=7.1, 1.3 Hz, 1H), 5.07 (s, 2H), 5.05 (thept, J=7.0, 1.4 Hz, 1H), 3.39 (d, J=7.1 Hz, 2H), 2.48-2.41 (m, 2H), 2.13-2.08 (m, 2H), 2.08-2.03 (m, 2H), 1.81 (q, J=1.0 Hz, 3H), 1.67 (q, J=1.2 Hz, 3H), 1.59 (d, J=1.3 Hz, 3H), 1.58-1.53 (m, 2H), 1.36-1.25 (m, 4H), 0.88 (t, J=7.0 Hz, 3H) ppm.

$^{13}$C NMR (151 MHz, Chloroform-d)=δ 154.8, 142.8, 138.9, 132.1, 123.8, 121.7, 110.6, 108.4, 39.7, 35.5, 31.5, 30.8, 26.3, 25.7, 22.6, 22.3, 17.7, 16.2, 14.0 ppm.

Use of Geraniol for the Derivatization of the Byproduct

Geraniol (3) is added in excess. Olivetol (2) reacts with geraniol to the product CBG (1) and the regio isomer (5) in a 1:1 ratio. The product (1) and regioisomer (5) have an increased inductive effect due to the newly formed bond. The product and regioisomer (5) gain in reactivity towards a second alkylation while the regioisomer is more sterically accessible. This leads to a major polyalkylation of the unwanted regioisomer and just a slight alkylation of the CBG (1). The disadvantage of the polyalkylation can therefore be turned to an advantage.

Scheme (11) Synthesis with Geraniol (3).

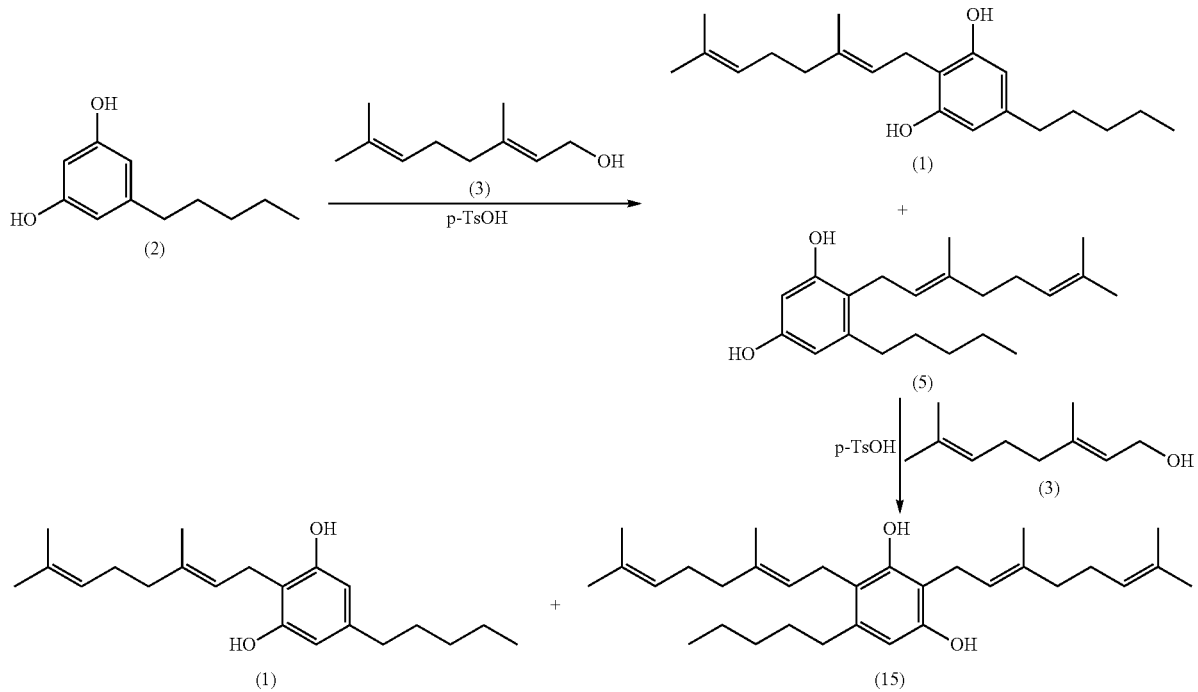

To a solution of olivetol (2) (20.0 g, 111 mmol, 1.00 eq.) and geraniol (30.8 g, 200 mmol, 1.80 eq.) in 200 mL toluene was added p-TSOH (0.86 g, 5.00 mmol, 0.05 eq.) at 40° C. The solution was stirred at 600 rpm for 30 min. The reaction was quenched by adding aq. sat. sodium bicarbonate (100 mL) and brine (100 mL). The organic phase was separated and the aqueous phase extracted with toluene (2×100 mL). The combined organic layer was dried over sodium sulfate and concentrated in vacuo to give the crude product (45.4 g). The raw product was dissolved in methanol (180 mL), water (20 mL) and was extracted with heptane (4×50 mL). The heptane phase was discarded. Brine (50 mL) was added to the aqueous phase (containing product), which was subsequently extracted with cyclohexane (5×50 mL). The cyclohexane phase was combined, dried over sodium sulfate and concentrated in vacuo. The residue (10 g) was further purified by distillation (0.8 mbar, 200-210° C.) and crystallization (seeding) in heptan (11 mL) to give a white crystalline product (2.84 g, 8.97 mmol, 8%).

$R_f$: 0.52 (1:1 cyclohexane/ethyl acetate) $KMnO_4$ $^1$H NMR (600 MHz, Chloroform-d) δ=6.24 (s, 2H), 5.27 (th, J=7.1, 1.3 Hz, 1H), 5.07 (s, 2H), 5.05 (thept, J=7.0, 1.4 Hz, 1H), 3.39 (d, J=7.1 Hz, 2H), 2.48-2.41 (m, 2H), 2.13-2.08 (m, 2H), 2.08-2.03 (m, 2H), 1.81 (q, J=1.0 Hz, 3H), 1.67 (q, J=1.2 Hz, 3H), 1.59 (d, J=1.3 Hz, 3H), 1.58-1.53 (m, 2H), 1.36-1.25 (m, 4H), 0.88 (t, J=7.0 Hz, 3H) ppm.

$^{13}$C NMR (151 MHz, Chloroform-d)=δ 154.8, 142.8, 138.9, 132.1, 123.8, 121.7, 110.6, 108.4, 39.7, 35.5, 31.5, 30.8, 26.3, 25.7, 22.6, 22.3, 17.7, 16.2, 14.0 ppm.

Linalool as an Alternative Allylic Alcohol

An alternative allylic alcohol to geraniol (3) is linalool (4), due to the diverse tolerance of the allylic alcohol for the alkylation. The use of Linalool results in the same product and similar byproduct mixture.

Scheme (12) Synthesis with Linalool (4).

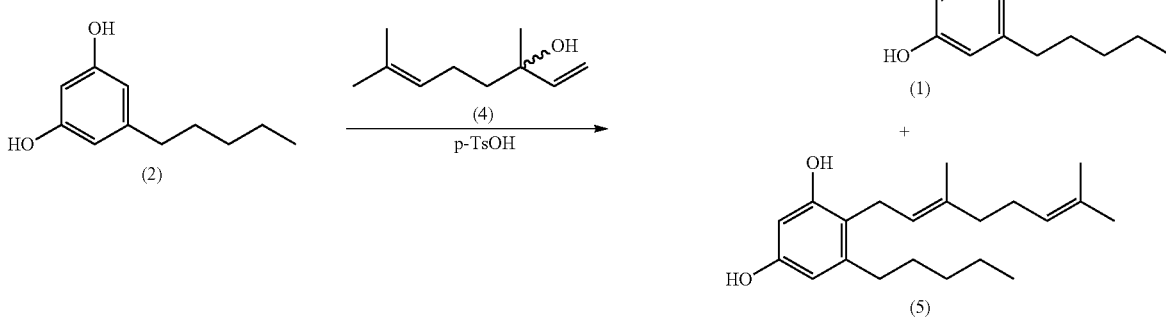

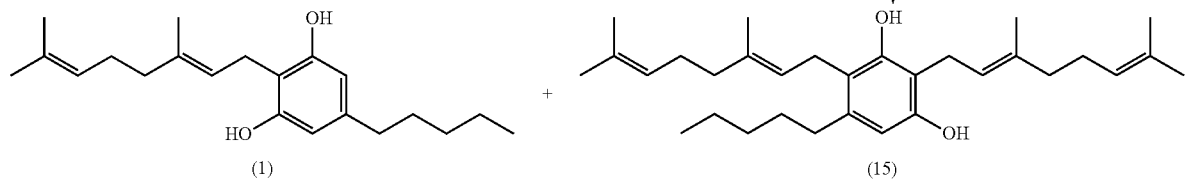

To a solution of olivetol (2) (20.0 g, 111 mmol, 1.00 eq.) and Linalool (4) (30.8 g, 200 mmol, 1.80 eq.) in 200 mL toluene was added p-TsOH (1.91 g, 11.1 mmol, 0.10 eq.) at 40° C. The solution was stirred at 600 rpm for 1 h. The reaction was quenched by adding aq. sat. sodium bicarbonate (100 mL) and brine (100 mL). The organic phase was separated and the aqueous phase extracted with toluene (2×100 mL). The combined organic layer was dried over sodium sulfate and concentrated in vacuo to give the crude product (44.7 g). The raw product was dissolved in methanol (180 mL), water (20 mL) and was extracted with heptane (4×50 mL). The heptane phase was discarded. Brine (50 ml) was added to the aqueous phase (containing product), which was extracted with cyclohexane (5×50 mL). The cyclohexane phase was combined, dried over sodium sulfate and concentrated in vacuo. The residue (11 g) was further purified by distillation (0.5 mbar, 200-210° C.) and crystallization (seeding) in heptane (6 mL) to give a white crystalline product (1) (1.23 g, 3.88 mmol, 3%)

$R_f$: 0.52 (1:1 cyclohexane/ethyl acetate) $KMnO_4$.

$^1$H NMR (600 MHz, Chloroform-d) δ=6.24 (s, 2H), 5.27 (th, J=7.1, 1.3 Hz, 1H), 5.07 (s, 2H), 5.05 (thept, J=7.0, 1.4 Hz, 1H), 3.39 (d, J=7.1 Hz, 2H), 2.48-2.41 (m, 2H), 2.13-2.08 (m, 2H), 2.08-2.03 (m, 2H), 1.81 (q, J=1.0 Hz, 3H), 1.67 (q, J=1.2 Hz, 3H), 1.59 (d, J=1.3 Hz, 3H), 1.58-1.53 (m, 2H), 1.36-1.25 (m, 4H), 0.88 (t, J=7.0 Hz, 3H) ppm.

$^{13}$C NMR (151 MHz, Chloroform-d)=δ 154.8, 142.8, 138.9, 132.1, 123.8, 121.7, 110.6, 108.4, 39.7, 35.5, 31.5, 30.8, 26.3, 25.7, 22.6, 22.3, 17.7, 16.2, 14.0 ppm.

EXAMPLE 5: BORON TRIFLUORIDE ETHERATE AS CATALYST IN BATCH AND CONTINUOUS PROCESSES

Olivetol (2) was alkylated with geraniol (3) under catalysis of boron trifluoride etherate. This was done in a normal batch reaction and in a continuous flow reactor.

Scheme (13) Synthesis with boron trifluoride etherate.

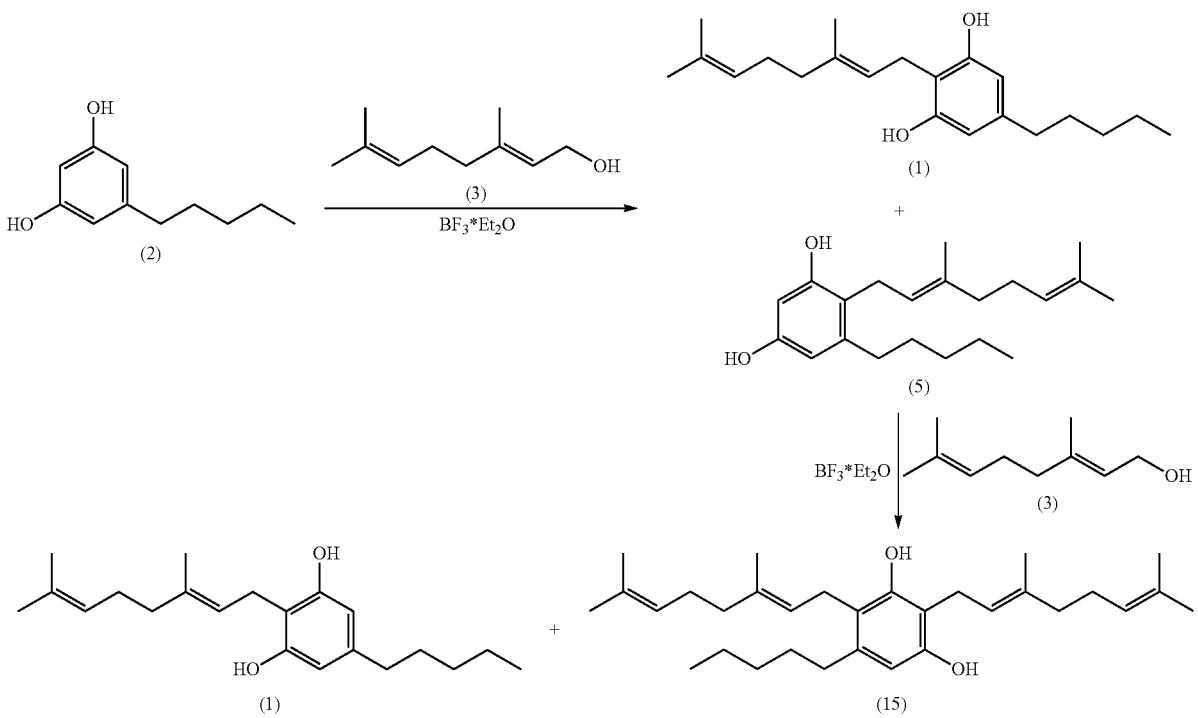

Batch Reaction

To a solution of olivetol (200 mg, 1.11 mmol, 1.00 eq.), geraniol (223 mg, 1.44 mmol, 1.30 eq.) in 20 mL dichloromethane at 20° C. was added boron trifluoride etherate (126 mg, 110 µL, 0.88 mmol, 0.80 eq.). The solution was stirred for 3 min and quenched by the addition of sodium bicarbonate (10 ml). The layers were separated and the organic layer was washed with brine. The organic layer was dried over sodium sulfate and concentrated in vacuo to give the crude product. After purification by silica flash column chromatography (gradient: cyclohexane/ethyl acetate) the product (6 mg, 0.02 mmol, 3%) could be obtained as a white solid.

Continuous Flow Reaction

A continuous flow reactor with a volume of 18 mL was fed starting material solution A, consisting of olivetol (2) (5.00 g, 14.7 mmol, 1.00 eq.) and geraniol (3) (5.56 g, 36.1 mmol, 1.30 eq.) in 40 ml dichloromethane. Catalyst solution B consisted of boron trifluoride etherate (4.72 mg, 33.2 mmol, 1.20 eq.) in 40 mL dichloromethane.

Starting material solution A was pumped with 24 mL/min and catalyst solution B was pumped with 12 ml/min while the reaction was stirred at 1300 rpm. The reaction mixture left the reactor with a flow of 36 ml/min through a 1.5 m long PTFE-hose (20 mL volume) into an aq. sat. sodium bicarbonate solution.

The quenched mixture was stirred for 15 min, cyclohexane (150 mL) was added and the phases were separated. The aqueous phase was extracted twice with cyclohexane. The combined organic phase was dried over sodium sulfate and concentrated in vacuo. The crude product was purified by silica flash column chromatography and gave the product (95 mg, 0.30 mmol, 2%) as a white solid.

EXAMPLE 6: SOLVING THE PURIFICATION ISSUE BY TECHNICAL SOLUTION AS SMB OR CPC

As a technical solution of purifying a mixture of CBG (1) and its byproducts non-standard purification methods (SMB, CPC) were evaluated.

SMB

The simulated moving bed (SMB) chromatography was done by using a SMB apparatus by Knauer. The concept is to use eight smaller solid adsorbents columns instead of a large one and rotate these columns in the opposite direction of the flow of the mobile phase. A solvent stream and a feed stream (containing CBG (1) and byproducts) is constantly applied. When running at a steady state, the various stages of separation are carried out simultaneously by different columns. The extract and raffinate outlet deliver under optimized conditions the product (1) in the raffinate fractions and the regioisomer (5) in the extract fractions (http://sembabio.com/simulated-moving-bed-chromatography/). Advantages of this continuous separation process are higher productivity and purity compared with a lower solvent consumption compared to standard preparative HPLC or silica flash column chromatography.

The eluent was prepared by adding 5 kg dest. water to 15.8 kg methanol.

The feed solution was prepared by dissolving 19.70 g of the CBG mix (45% CBG) in 780 mL eluent.

The pump flow of the feed, eluent and two internal pumps for zone 4 and 2 were adjusted as in the Table (1). After an equilibration time of 8 h, the raffinate and extract were collected.

TABLE (1)

| SMB conditions. | | |
| --- | --- | --- |
| Rotation time | 10.81 | rpm |
| zone 4 pump | 3.65 | mL/min |
| zone 2 pump | 4.7 | mL/min |
| Feed pump | 0.2 | mL/min |
| Eluent pump | 4.6 | mL/min |
| Raffinate | 1.3 | mL/min |
| Extract | 3.5 | mL/min |

The product containing raffinate fractions were extracted with cyclohexane, dried over sodium sulfate and concentrated in vacuo. After crystallization the white solid product CBG (1) could be obtained

CPC

Centrifugal Partition Chromatography is a separation technique of the field of liquid-liquid chromatography. The separation principle is based on the different distribution of the product CBG (1) and the impurities between two immiscible liquid phases which are mixed together to form a two-phase system, and are then separated multiple times (http://www.kromaton.com/en/the-cpc/technologies).

The mixing and separation was done in a 100 mL centrifugal rotor by Gilson. The stationary phase was retained in the rotor through centrifugal force. The CPC is constantly fed with the mobile phase which is containing the extracted solutes and is collected in fractions. It is therefore necessary to find a solvent mixture (stationary and mobile phase) that has an adequate distribution of compounds (which should be separated) as well the ability to partition fast enough. An advantages of liquid-liquid techniques are as high speed, high loading and high resolution (Garrard: *Phytochem Rev.*, 2014; 13(2), 547-572).

A usable solvent mixture is heptane:ethanol:water in a ratio of 5:4:1.5 (volume) and a rotation speed of 2500 rpm. Other test systems like heptane:ethyl acetate:methanol:water (1:1:1:1) were not successful in separation of CBG (1) and the regioisomer (5).

The solvent mixture was prepared by mixing heptane (300 mL), ethanol (240 mL), water (90 mL). The phases were left to separate in a separation funnel, from which the filling of the CPC took place. The stationary phase (upper heptane phase) was filled with a flow of 5 mL/min at a rotation of 500 rpm. (descending mode) The mobile phase (lower ethanol/water phase) was filled with a flow of 5 mL/min at a rotation of 2500 rpm.

For starting the separation 500 mg of the product/byproduct mix was dissolved in 5 mL of the stationary phase and 5 mL of the mobile phase. After injection, the collection of the fractions took place with a flow of 2 mL/min which enabled an enrichment of CBG >70%. The following crystallization gave the pure product CBG (1).

EXAMPLE 7: BIOLOGICAL TESTING

Introduction

The monooxygenase tyrosinase is a key enzyme in the melanogenesis, the production of melanin. Melanin is responsible for skin and hair pigmentation and protects the skin against radiation. However, abnormal melanin production can lead to various skin disorders like hyperpigmentation, lentigo, vitiligo and skin cancer. Additionally, inhibition of melanin production can have some cosmetic benefits due to skin whitening/lightening.

A prominent tyrosinase—and subsequently of melanin production—inhibitor is kojic acid, which is used in the following tests as a positive control.

Experimental Procedure

Cell Culture. The cell line B16 (mouse melanocytes, obtained from ATCC and part of SimDerma platform) was maintained in supplemented DMEM medium containing 10% FBS and 1% antibiotics penicillin/streptomycin (DMEM complete medium) at 37° C. in a humidified atmosphere of 5% $CO_2$.

Measurements of Tyrosinase Activity: To measure the tyrosinase activity of the cells, B16 cells were treated for 3 days with several doses of the compounds (cannabigerol (1) or kojic acid), then lysed by incubation at 4° C. for 30 min in lysis buffer (20 mM sodium phosphate, pH 6.8, 1% Triton X-100, 1 mM PMSF, 1 mM EDTA) containing protease inhibitors cocktail. The lysates were centrifuged at 15.000 g for 10 min to obtain the supernatant as the source of tyrosinase. The reaction mixture contained 20 mM phosphate buffer, pH 6.8, 1.25 mM L-dopa (Sigma-Aldrich). After incubation at 37° C. for 30 min, dopachrome formation was monitored by measuring absorbance at a wavelength of 475 nm in a microplate reader (TriStar LB 941 Berthold Technologies, GmbH & Co. KG). Kojic acid was used as a positive control.

Determination of Melanin Content and Cytotoxicity in B16 cells: To analyse the effect of cannabigerol (1) on melanogenesis, B16 melanoma cells were used as a cellular assay system to evaluate the depigmenting activity in cell cultures. B16 cells (4A5) were treated for 3 days with several doses of the compounds (cannabigerol (1) or kojic acid). The cells were washed with phosphate buffer saline (PBS) at the end of the treatment and dissolved in 1 N NaOH containing 10% DMSO for 1 h at 60° C. The absorbance at 405/490 nm was measured (TriStar LB 941 Berthold Technologies, GmbH & Co. KG) and the melanin content quantified with a reference standard of synthetic melanin (Sigma-Aldrich, St Louis, Mo., USA). Cytotoxicity was measured in parallel by the MTT assay to discard that melanin inhibition is not masked by cytotoxicity. Kojic acid was used as a positive control.

Results

Tyrosinase Activity

Cannabigerol (1) inhibited tyrosinase activity in the doses of 0.5 µg/ml and higher. With the dose of 1 µg/ml cannabigerol (1) the inhibition of tyrosinase was as potent as the effect of 2 mM of kojic acid. Cannabigerol (1) exhibited no cytotoxic effects in any of the tested doses. FIG. 2 shows the biological effects of cannabigerol on tyrosinase activity in B16 melanocytes.

Melanin Production

As shown in FIG. 2 melanin production was dose dependently prevented by cannabigerol. The dosage of 0.5 µg/ml exhibited similar inhibitory effects as 2 mM of kojic acid, which showed approx. 20% reduction of melanin production, 1 µg/ml cannabigerol (1) was even more potent with about 30% inhibition of melanin production. Cannabigerol (1) exhibited no cytotoxic effects in any of the tested doses. FIG. 3 shows the biological effects of cannabigerol (1) on melanin production in B16 melanocytes.

The invention claimed is:

1. A method for producing cannabigerol, the method comprising:
   (i) reacting olivetol with one or more allylic compound(s) having a leaving group in the presence of an acidic or Lewis acidic catalyst and forming cannabigerol, and wherein at least one of said allylic compound(s) is an allylic compound of formula (I) or (II), wherein X represents the leaving group;

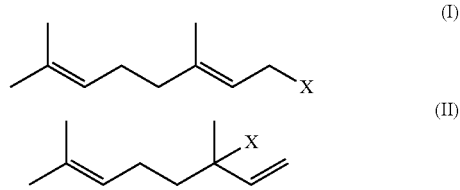

and wherein the olivetol is reacted with said allylic compound(s) at a molar ratio of olivetol- to-the allylic compounds being in the range of from 1:1.2 to 1:1.9; and (ii) purifying cannabigerol by distillation.

2. The method according to claim 1, wherein the at least one allylic compound of formula (I) is geraniol, and the at least one allylic compound of formula (II) is linalool.

3. The method according to claim 1, wherein step (i) comprises:
   (ia) reacting olivetol with one or more allylic compounds of formula (I) or (II) at a molar ratio of olivetol-to-said compounds of formula (I) or (II) being in the range of from 1:0.9 to 1:1.1, to form a mixture; and
   (ib) reacting the mixture of step (ia) with a steric allylic compound having a leaving group at a molar ratio of steric allylic compound-to-olivetol used in step (ia) being in the range of from 0.3:1 to 0.5:1; and
   wherein an allylic residue of the steric allylic compound having a leaving group comprises at least 5 carbon atoms, provided that if the allylic compound comprises 10 or less carbon atoms, it includes a ring or a bridged ring system.

4. The method according to claim 3, wherein the at least one allylic compound of formula (I) is geraniol, the at least one allylic compound of formula (II) is linalool, and the steric allylic compound having a leaving group is menthadienol.

5. The method according to claim 1, wherein the reaction of (i) is conducted as a batch or continuous flow reaction process.

6. The method according to claim 1, wherein the acidic or Lewis acidic catalyst includes at least one member selected from the group consisting of p-TsOH, formic acid, acetic acid, butyric acid, oxalic acid, phosphoric acid, sulfuric acid, benzoic acid, $AlCl_3$, $ZnCl_2$, $FeCl_3$, $AlBr_3$, $(CF_3SO_3)_2Zn$, $BF_3*Et_2O$, $BF_3*2CH_3COOH$, $BF_3*CH_3OH$, $BF_3*THF$, $CH_3SO_3H$, and aluminium isopropoxide.

7. The method according to claim 1, wherein the method further comprises:
   (iii) crystallizing the cannabigerol of (ii).

8. The method of claim 5, wherein the reaction of (i) is conducted as a continuous flow reaction process.

* * * * *